(12) United States Patent
Fang et al.

(10) Patent No.: US 10,839,493 B2
(45) Date of Patent: Nov. 17, 2020

(54) TRANSFERRING IMAGE STYLE TO CONTENT OF A DIGITAL IMAGE

(71) Applicant: Adobe Inc., San Jose, CA (US)

(72) Inventors: Chen Fang, Sunnyvale, CA (US); Zhe Lin, Fremont, CA (US); Zhaowen Wang, San Jose, CA (US); Yulun Zhang, Somerville, MA (US); Yilin Wang, Sunnyvale, CA (US); Jimei Yang, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 119 days.

(21) Appl. No.: 16/246,051

(22) Filed: Jan. 11, 2019

(65) Prior Publication Data
US 2020/0226724 A1    Jul. 16, 2020

(51) Int. Cl.
*G06T 5/00*    (2006.01)
*G06K 9/62*    (2006.01)
*G06T 9/00*    (2006.01)

(52) U.S. Cl.
CPC ............ *G06T 5/005* (2013.01); *G06K 9/6256* (2013.01); *G06T 9/00* (2013.01); *G06T 2207/20081* (2013.01)

(58) Field of Classification Search
CPC . G06T 5/005; G06T 9/00; G06T 2207/20081; G06K 9/6256
See application file for complete search history.

(56) References Cited

U.S. PATENT DOCUMENTS

2020/0151849 A1* 5/2020 Liao ...................... G06T 3/0012

OTHER PUBLICATIONS

Li et al., Universal Style Transfer via Feature Transforms, Nov. 17, 2017, arXiv:1705.08086v2, [cs.CV], pp. 1-11 (Year: 2017).*
Gu,"Arbitrary Style Transfer with Deep Feature Reshuffle", Jun. 20, 2018, 10 pages.
Huang,"Arbitrary Style Transfer in Real-time with Adaptive Instance Normalization", Jul. 30, 2017, 11 pages.
Li,"Universal Style Transfer via Feature Transforms", Nov. 17, 2017, 11 pages.
Sheng,"Avatar-Net: Multi-scale Zero-shot Style Transfer by Feature Decoration", May 22, 2018, 13 pages.

* cited by examiner

*Primary Examiner* — Ping Y Hsieh
(74) *Attorney, Agent, or Firm* — SBMC

(57) ABSTRACT

In implementations of transferring image style to content of a digital image, an image editing system includes an encoder that extracts features from a content image and features from a style image. A whitening and color transform generates coarse features from the content and style features extracted by the encoder for one pass of encoding and decoding. Hence, the processing delay and memory requirements are low. A feature transfer module iteratively transfers style features to the coarse feature map and generates a fine feature map. The image editing system fuses the fine features with the coarse features, and a decoder generates an output image with content of the content image in a style of the style image from the fused features. Accordingly, the image editing system efficiently transfers an image style to image content in real-time, without undesirable artifacts in the output image.

20 Claims, 8 Drawing Sheets

TRANSFERRING IMAGE STYLE TO CONTENT OF A DIGITAL IMAGE

BACKGROUND

Some image editing applications transfer style of a reference style image, such as a painting or drawing, to content of a digital image to render the content in the style of the reference style image. For instance, the style of a painting done by an artist may be transferred to a portrait in a photograph, resulting in a digital image that includes the portrait as if it was painted by the artist.

Image editing applications transfer image style to image content in a variety of ways. Some image editing applications match statistics of a content image to statistics of a style image, usually resulting in blurry images. Other image editing applications apply a transformation to data between layers of a neural network, such as a whitening and color transformation. However, since the transformation is applied for each neural layer, these image editing applications are slow and consume large amounts of processing and memory resources. Image editing applications may also directly transfer patches of a style image into an output image, often producing unpleasing results by transferring features from a style image into content for which the features are inappropriate or unnatural, such as by transferring facial features into a landscape or sky.

Furthermore, these image editing applications often introduce undesirable distortions, such as artifacts, blurring, and loss of structural information. In addition, these image editing applications often work for only a small number of style classes, such as "seen" classes of styles that are used to train the image editing applications. Accordingly, image editing applications that transfer style of a style image to content of a content image do not generalize to arbitrary styles, including "unseen" classes of styles that are not used to train the image editing applications. Moreover, the image editing applications may be too slow for some applications, such as real-time applications that require editing of digital images without perceptible delay, and too costly for some implementations with limited processor and memory resources.

SUMMARY

Techniques and systems are described to transfer style of a style image to content of a content image efficiently, accurately, and quickly, e.g., without perceptible delay to a user. An image editing system includes a generative network with a whitening and color transform used for one pass of encoding and decoding, rather than multiple passes, resulting in minimal or no processing delay and low memory usage. The image editing system includes an encoder to extract features from a content image and extract features from a style image. The whitening and color transform generates coarse features from the features of the content image and the style image extracted by the encoder. The image editing system also includes a feature transfer module to swap the coarse features resulting from the whitening and color transform with features of the style image based on patch matching, thus enhancing the ability of the image editing system to generalize to unseen style classes. In one example, the feature transfer module swaps features iteratively, to fully transfer features of the style image and generate fine features. The image editing system fuses the fine features generated by the feature transfer module with the coarse features resulting from the whitening and color transform. A decoder generates an output image with the content of the content image in the style of the style image. Accordingly, the image editing system can efficiently and accurately transfer an image style to image content without undesirable artifacts in real-time.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
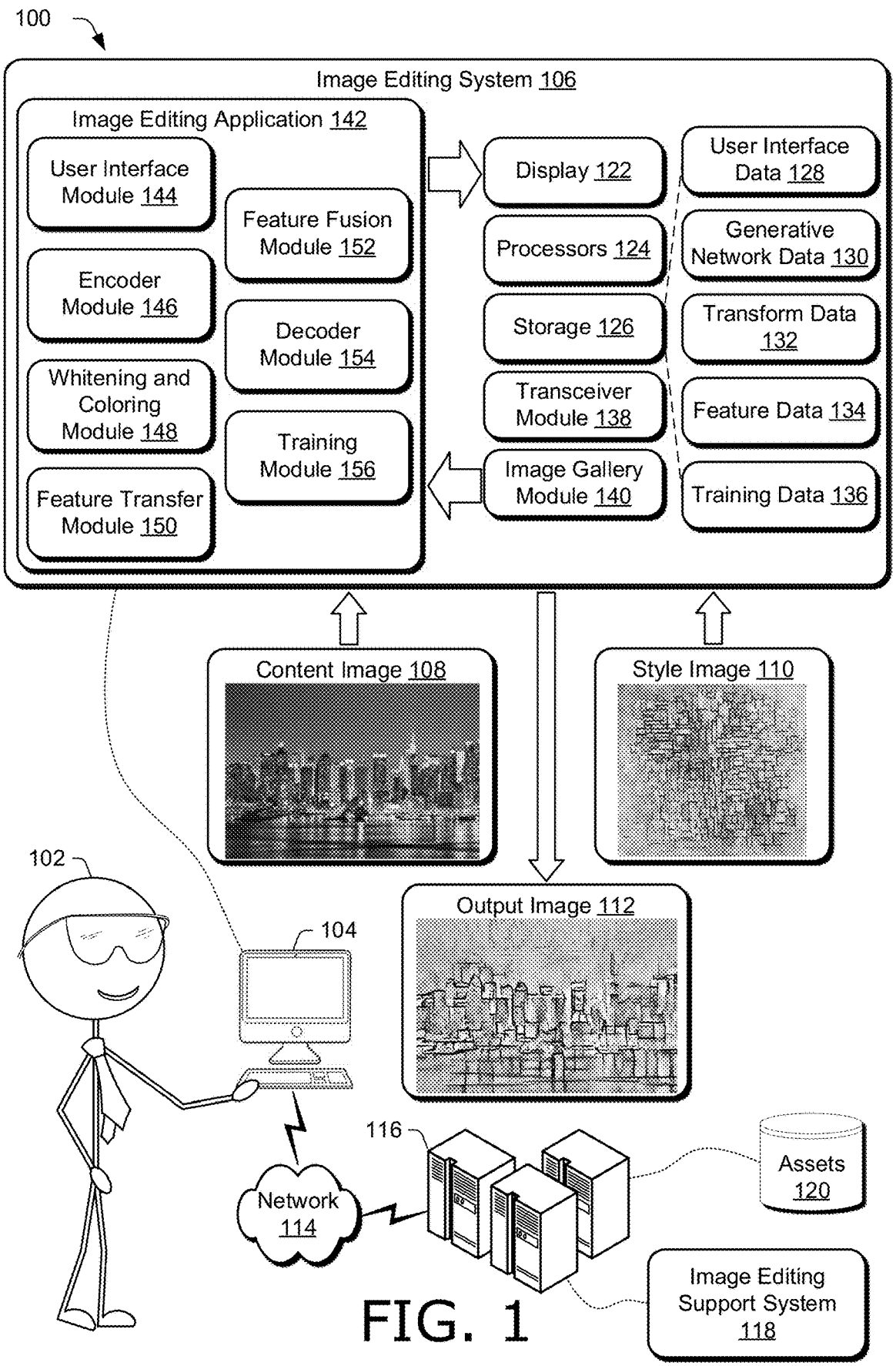
FIG. 1 illustrates a digital medium environment in an example implementation that is operable to employ techniques described herein.

Transferring the style of a style image, such as a painting or drawing, to content of a content image so that the content is rendered in the style of the style image is a common editing operation for many image editing applications. For instance, image editing applications may transfer the style of a painting done by an artist (e.g., a style image) to a portrait in a photograph (e.g., a content image) so that the portrait appears as if it was painted by the artist. To transfer the style of a style image to the content of a content image, however, most image editing applications introduce undesirable distortions into the resulting digital image, including blurring, loss of structural information, and artifacts (e.g., by directly copying inappropriate or unnatural features of a style image). Furthermore, usage of image editing applications is often limited to seen style classes for which the image editing applications have been trained, so that the image editing applications fail to produce acceptable images for unseen style classes (e.g., style classes omitted when the image editing applications are trained). Moreover, because some image editing applications apply a transformation for each layer of an encoder-decoder pair, multiple passes of data through the transformation are required, prohibiting real-time operation due to significant processing delay, and consuming valuable processor and memory resources.

Accordingly, this disclosure describes systems, devices, and techniques for quickly and efficiently transferring image style to content of a digital image. An image editing system includes a generative network with an encoder and decoder, and a whitening and color transform used for one pass of encoding and decoding, rather than multiple passes. Consequently, the processing delay and memory usage of the image editing system are significantly reduced compared to image editing applications that apply a transformation for each layer of encoding and decoding.

The image editing system includes an encoder that extracts features from a digital image into a feature map. In one example, the encoder separately processes a content image having content, and a style image depicted in a style, and generates respective feature maps for the content image and the style image. The content image and the style image may be user-provided, such as by selection of thumbnail images exposed in a user interface of the image editing system.

The whitening and color transform generates a coarse feature map from the features maps of the content image and the style image extracted by the encoder. In one example, the whitening and color transform generates the coarse feature map so that a covariance matrix of the coarse feature map matches a covariance matrix of the style feature map (e.g., the feature map of the style image). For instance, the whitening and color transform may first whiten the content feature map (e.g., the feature map of the content image) by applying a linear transformation to the content feature map so that the result has an identity matrix as a covariance matrix. The whitening and color transform may then color this result by transforming it with another linear transformation based on the style feature map to generate the coarse feature map having a covariance matrix that matches the covariance matrix of the style feature map. Singular value decompositions can be used to determine the linear transformations.

The image editing system also includes a feature transfer module that swaps patches of the coarse feature map with patches of the style feature map that are determined to match the patches of the coarse feature map based on a similarity measure, such as a cosine similarity measure. The feature transfer module generates a fine feature map by swapping patches from the style feature map into the coarse feature map. By using the coarse feature map generated by the whitening and color transform, rather than the feature map of the content image generated by the encoder, the ability of the image editing system to generalize to unseen style classes is enhanced.

In one example, the feature transfer module generates a fine feature map iteratively. At each iteration, the feature transfer module updates the coarse feature map by swapping patches of the coarse feature map with patches determined from the style feature map to form a fine feature map, and generates, from the fine feature map, an updated coarse feature map for use in a next iteration. For instance, the feature transfer module may swap matching patches from the style feature map into the coarse feature map to form a fine feature map. Additionally or alternatively, the feature transfer module may swap the matching patches by blending the patches of the coarse feature map with the matching patches of the style feature map to form blended patches, and replacing the patches of the coarse feature map with the blended patches to form the fine feature map. Blending may include forming a linear combination of patches, with user-selectable combining weights.

Additionally or alternatively, the feature transfer module may generate an updated feature map at each iteration from the fine feature map by linearly combining the coarse feature map from a previous iteration and the fine feature map from a current iteration. For instance, the fine feature map and the coarse feature map may be combined with user-selectable combining weights different than the user-selectable combining weights used to blend patches.

In one example, the feature transfer module continues to iterate the fine feature map until a termination condition is met. For instance, the feature transfer module may continue to iterate the fine feature map by swapping matching patches and updating the coarse feature map until patches of the style feature map no longer match patches of the updated coarse feature map (e.g., similarity measures between patches are below a threshold similarity value). Hence, the feature transfer module makes full use of all patterns of the style feature map when generating a fine feature map, which reduces undesired distortions in the output image generated by the image editing system, such as introduction of artifacts, blurring, and loss of structural information.

The image editing system also includes a feature fusion module that fuses the coarse feature map generated by the whitening and coloring module with the fine feature map generated by the feature transfer module. The feature fusion module can fuse the coarse feature map and the fine feature map in any suitable way. In one example, the feature fusion module fuses the coarse feature map and the fine feature map by concatenating the fine feature map and the coarse feature map along a channel dimension of the decoder of the image editing system. The decoder generates an output image from the fused feature map, and the output image includes the content of the content image in the style of the style image.

Accordingly, the image editing system can efficiently transfer an image style to image content without significant processing delay, and is therefore suitable for real-time applications. Furthermore, the image editing system has low computational requirements compared to image editing systems that apply transformations at each neural layer, and is therefore suitable for implementations with limited processor and memory resources, such as implementations on mobile devices. In addition, since the image editing system fully transfers style features of the style image to the coarse feature map generated by the whitening and color transform, the image editing system generalizes to unseen style classes without introducing undesired distortions.

In the following discussion an example digital medium environment is described that may employ the techniques described herein. Example implementation details and procedures are then described which may be performed in the example digital medium environment as well as other environments. Consequently, performance of the example procedures is not limited to the example environment and the example environment is not limited to performance of the example procedures.

Example Digital Medium Environment

FIG. 1 is an illustration of a digital medium environment 100 in an example implementation that is operable to employ techniques described herein. As used herein, the term "digital medium environment" refers to the various computing devices and resources that can be utilized to implement the techniques described herein. The illustrated digital medium environment 100 includes a user 102 having at least one computing device. In the example in FIG. 1, user 102 is illustrated as having computing device 104, which may include one or more computing devices. For instance, computing device 104 may include one or more of a mobile phone, tablet, laptop computer, desktop computer, gaming device, goggles, glasses, camera, digital assistant, echo device, image editor, non-linear editor, digital audio workstation, copier, scanner, and the like. Moreover, computing device 104 may include a computing device ranging from a full resource device with substantial memory and processor resources (e.g., personal computers, game consoles) to a low-resource device with limited memory or processing resources (e.g., mobile devices).

In one example, computing device 104 includes a wearable device that is designed to be worn by, attached to, carried by, or otherwise transported by user 102. Examples of wearable devices include glasses, a smart band or watch, and a pod device such as clip-on fitness device, media player, or tracker. Other examples of a wearable device include but are not limited to a badge, a key fob, an access card, and a ring, an article of clothing, a glove, and a bracelet.

Various types of input devices and input instrumentalities can be used to provide input to computing device 104. For example, computing device 104 can recognize input as being a mouse input, stylus input, touch input, input provided through a natural user interface, and the like. Thus, computing device 104 can recognize multiple types of gestures including touch gestures and gestures provided through a natural user interface. In one example, computing device 104 includes speech recognition, identification, and synthesis functionalities, microphones, and speakers that allow computing device 104 to communicate with user 102 in a conversation, e.g., a user conversation.

Figure 8:
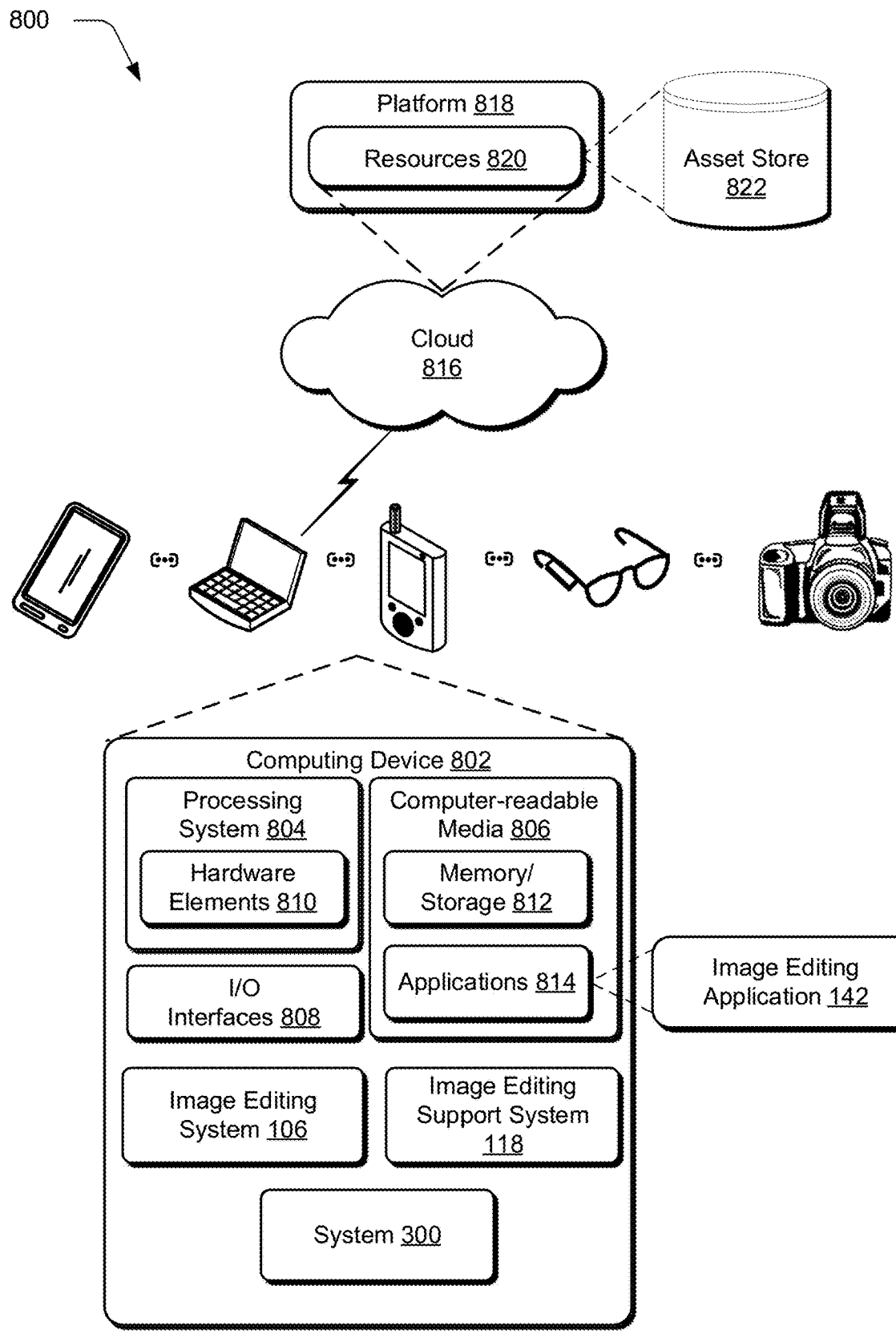
FIG. 8 illustrates an example system including various components of an example device that can be implemented as any type of computing device as described and/or utilized with reference to FIGS. 1-7 to implement aspects of the techniques described herein.

Furthermore, computing device 104 may be representative of one or a plurality of different devices, such as one or more devices connected to a network that perform operations "over the cloud" as further described in relation to FIG. 8. In one example, computing device 104 includes computing devices that are communicatively coupled to each other, such as with a low power wireless communication standard (e.g., a Bluetooth® protocol). Hence, an asset (e.g., image, video, text, drawing, document, file, and the like) generated, processed, edited, or stored on one device of computing device 104 can be communicated to, and displayed and processed on another device of computing device 104.

Computing device 104 includes image editing system 106 (discussed below in more detail) for transferring image style to content of a digital image. In the example digital medium environment 100, image editing system 106 obtains content image 108 and style image 110. Image editing system 106 can obtain the content image 108 and the style image 110 in any suitable way. In one example, the content image 108 and the style image 110 are user-provided. For instance, user 102 may provide the content image 108 and the style image 110 as inputs to the image editing system 106. Additionally or alternatively, user 102 may provide the content image 108 to image editing system 106, and select the style image 110 from a user interface exposed by image editing system 106. In one example, image editing system 106 obtains the content image 108 and the style image 110 by receiving the content image 108 and the style image 110, such as from a server as part of a training dataset of images stored in a database at the server. Hence, the content image 108 and the style image 110 may be used to train the image editing system 106.

In the example illustrated in FIG. 1, image editing system 106 transfers the style of the style image 110 to the content of the content image 108, and generates output image 112. For instance, the content image 108 depicts a landscape scene, and the style image 110 includes artwork in a mosaic-like style. Accordingly, image editing system 106 generates output image 112 which depicts the landscape scene of the content image 108 in the mosaic-style of the style image 110.

Computing device 104 is also coupled to network 114. Network 114 communicatively couples computing device 104 with server 116. Network 114 may include a variety of networks, such as the Internet, an intranet, local area network (LAN), wide area network (WAN), personal area network (PAN), cellular networks, terrestrial networks, satellite networks, combinations of networks, and the like, and as such may be wired, wireless, or a combination thereof.

Server 116 may include one or more servers or service providers that provide services and/or resources to computing device 104. Generally, resources provided by server 116 may be licensed, purchased, or may be made freely available, (e.g., without authentication, license, or account-based access). The resources can include any suitable combination of services and content, such as made available over network 114 by one or more providers. Some examples of services include, but are not limited to, an on-line shopping service, an image editing service, a web development and management service, a collaboration service, a social networking service, a messaging service, an advertisement service, a graphics design service, an animation service, an image storage service (including storage of photos, documents, records, files, and the like), a graphics editing service, an asset distribution service, and so forth. Content may include various combinations of assets, including videos, ads, audio, multi-media streams, animations, images, web documents, web pages, applications, device applications, text documents, drawings, presentations, stock photographs, user profiles, user preferences, user data (e.g., images stored in an image gallery), maps, computer code, pre-trained networks (e.g., feature extractors), and the like. Assets may be made available to image editing system 106, image editing support system 118, or combinations thereof, and stored at assets 120 of server 116. Hence, content image 108 and style image 110 may be stored at assets 120 of server 116 and provided to computing device 104 via network 114.

Furthermore, server 116 includes image editing support system 118 configurable to receive signals from computing device 104, process the received signals, and send the processed signals to computing device 104 to support transferring image style to content of a digital image. For instance, computing device 104 may obtain the content image 108 and the style image 110 and generate respective feature maps with image editing system 106. Computing device 104 may then communicate the feature maps to server 116 via network 114. Server 116, using image editing support system 118, may generate a coarse feature map and a fine feature map from the feature maps received from the computing device 104. Server 116 may then provide a concatenation of the coarse feature map and the fine feature map to computing device 104, which can generate the output image 112 with a decoder based on the concatenation of feature maps. Accordingly, image editing support system 118 of server 116 can include an instantiation of image editing system 106.

Computing device 104 includes image editing system 106 to transfer image style to content of a digital image. Image editing system 106 includes a display 122. Display 122 can expose any suitable data used by or associated with image editing system 106. In one example, display 122 displays a user interface for exposing assets, such as digital images, content images, style images, output images, results of whitening and coloring transforms, representations of feature maps, iteration parameters, combinations thereof, and the like. Display 122 can expose a user interface configurable to edit an image, such as a content image, a style image, and a "transfer image style" button to enable image editing system 106 to transfer a style of the style image to content of the content image.

Display 122 can include any suitable type of display, such as a touchscreen, liquid crystal display, plasma display, head-mounted display, projector and screen, and the like. A touchscreen of display 122 can include any suitable type of touchscreen, such as a capacitive touchscreen, a resistive touchscreen, a surface acoustic wave touchscreen, an infrared touchscreen, an optical imaging touchscreen, an acoustic pulse recognition touchscreen, combinations thereof, and the like.

Image editing system 106 also includes processors 124. Hence, image editing system 106 may be implemented at least partially by executing instructions stored on storage 126 on processors 124. For instance, processors 124 may execute portions of image editing application 142 (discussed below in more detail).

Storage 126 can be any suitable type of storage accessible by or contained in image editing system 106. Storage 126 stores and provides access to and from memory included in storage 126 for any suitable type of data. For instance, storage 126 includes user interface data 128, including data associated with user interfaces, such as user preferences (e.g., font size and style, locations and sizes of panels presented in a user interface, or preferred by users, and the like), data of users operating a user interface (e.g., user histories of edits including user-selections of style images, user interface configurations (e.g., different layouts, language options, etc.), controls and adjusters (e.g., sliders, lists of user gestures to control a user interface, etc.), representations of user-selectable combining weights, user interface version numbers, lists of operating systems supported by various user interfaces, thumbnail images of images to display in a user interface, toolbar icons, speech libraries for voice-actuated commands and gestures, images exposed in a user interface, such as content images, style images, output images, training images (e.g., images of a dataset of training images), and the like.

Storage 126 also includes generative network data 130, including data associated with a generative network of image editing system 106, such as encoder and decoder weights, feature maps generated by an encoder, training data used to train an encoder and decoder, indicators of a loss function of a network (e.g., a loss measurement of a neural network over a training set, a loss measurement for an output image generated by a neural network, and the like), weighting parameters of a loss function (e.g., respective weights of a content loss term and a style loss term), encoder and decoder parameters (e.g., filter sizes and numbers of filters), activation functions, and the like.

Storage 126 also includes transform data 132, including data associated with transformations used to generate a coarse feature map, such as parameters of a whitening and coloring transform, coarse feature maps, style feature maps, mean values of feature maps, covariance matrices, singular-value decompositions, linear transformations based on singular-value decompositions, eigenvalues, eigenvectors, and the like.

Storage 126 also includes feature data 134, including data associated with features of digital images, such as feature maps (e.g., content feature maps, style feature maps, coarse feature maps, updated coarse feature maps, fine feature maps), patches of feature maps, matching patches of feature maps (e.g., pairs of patches including a patch of a coarse feature map and a patch of a style feature map determined to match the patch of the coarse feature map), similarity measures, such as cosine similarities between patches of feature maps, iteration parameters, combining weights, fused feature maps (e.g., concatenated coarse feature maps and fine feature maps), and the like.

Storage 126 also includes training data 136, including data associated with features of training image editing system 106, such as a training database used to train encoders and decoders, weights of networks (e.g., weights of spatial filters of encoders and decoders), training losses computed while training a network (e.g., content loss terms, style loss terms, and combinations thereof), combining weights of loss terms, sources of training datasets, indicators of images of a training dataset used to train a network, indicators of images of a training dataset skipped when training a network, and the like.

Furthermore, image editing system 106 includes transceiver module 138. Transceiver module 138 is representative of functionality configured to transmit and receive data using any suitable type and number of communication protocols. For instance, data within image editing system 106 may be transmitted to server 116 with transceiver module 138. Furthermore, data can be received from server 116 with transceiver module 138. Transceiver module 138 can also transmit and receive data between devices included in computing device 104. In one example, transceiver module 138 includes a low power wireless communication standard (e.g., a Bluetooth® protocol) for communicating data between devices of computing device 104.

Image editing system 106 also includes image gallery module 140. Image gallery module 140 is representative of functionality configured to obtain and manage images of image editing system 106, such as images that can be edited (e.g., by transferring an image style to content of an image), content images, style images, images in an animation sequence, thumbnail representations displayed in a user interface (e.g., thumbnail images of images in an animation sequence exposed in a user interface), a rasterized image, images represented by vector graphics, and the like. Hence, image gallery module 140 may use transceiver module 138 to obtain any suitable data from any suitable source, including obtaining digital images from a user's directory of files on computing device 104 or server 116, obtaining images from a user's photo gallery (e.g., an online photo sharing service, images stored in a user's image editing application, such as Photoshop®), obtaining images a user has posted in a social media post, blog, online comment, and the like, images a user has attached to an email, text, or other communication sent from or received by computing device 104, images provided by a search service, such as an online search for digital images related to a search query, images obtained from a database of stock images, images provided by user 102 (e.g., receiving user-supplied images), images captured by a computing device, such as with a camera integrated into computing device 104, and the like. Images obtained by image gallery module 140 are stored in storage 126 and made available to modules of image editing application 142.

Image editing system 106 also includes image editing application 142. Image editing application 142 includes user interface module 144, encoder module 146, whitening and coloring module 148, feature transfer module 150, feature fusion module 152, decoder module 154, and training module 156. These modules work in conjunction with each other to transfer image style to content of a digital image quickly and efficiently, e.g., in real-time with no perceptible delay to a user.

Furthermore, though the description of image editing system 106 and image editing application 142 describes transferring the style of a style image to the content of a content image, image editing system 106 and image editing application 142 can be used to jointly transfer the style of any suitable asset, such as a document, web page, map, slide, presentation, image frame of a video or animation sequence, artwork, painting, drawing, sketch, photograph, and the like, to any other suitable asset, such as a document, web page, map, slide, presentation, digital image, etc.

User interface module 144 is representative of functionality configured to generate, manage, and cause display of any suitable user interface, such as a user interface including a digital image. A user interface of user interface module 144 can expose any suitable data, such as a content image, a style image, an output image having the content of the content image in the style of the style image, an animation sequence of images, representations of feature maps, iteration parameters, similarity measures, combinations thereof, and the like.

A user interface of user interface module 144 can expose any suitable control options, such as options for selecting images, including lists of images and thumbnail representations of images, options for selecting any suitable threshold used by image editing system 106, options for selecting combining weights, etc. In one example, a user adjusts a slider control exposed in a user interface of user interface module 144 to select a threshold level, such as a similarity measure threshold used to control a number of iterations when feature transfer module 150 iteratively generates a fine feature map.

In one example, a user interface of user interface module 144 exposes thumbnail representations of images, such as images retrieved from by image gallery module 140. A user can select a thumbnail representation of an image and cause the style of the selected image to be transferred to content of a content image. Additionally or alternatively, a user can select a thumbnail representation of an image and cause the content of the selected image to be updated by transferring a style of a style image to the content of the selected image.

A user interface generated by user interface module 144, along with any suitable information, such as configurations settings of the user interface, user gestures (e.g., user inputs), thumbnail images, user preferences, images exposed in a user interface, combinations thereof, and the like, used by or calculated by user interface module 144 are stored in user interface data 128 of storage 126 and made available to modules of image editing application 142. In one example, a user interface generated by user interface module 144 is displayed by display 122, and the user interface exposes a content image, a style image, and an output image generated by transferring the style of the style image to the content of the content image.

Encoder module 146 is representative of functionality configured to extract features from digital images into feature maps. Encoder module 146 can extract features from a digital image and generate a feature map in any suitable way. In one example, encoder module 146 includes an encoder, and decoder module 154 includes a decoder that form an encoder-decoder of a neural network. For instance, encoder module 146 may pass a digital image through a series of layers of an encoder that progressively downsample (e.g., by a factor of two) to generate a feature map. In a decoder of decoder module 154, the process of the encoder is reversed, and layers of the decoder progressively upsample the feature map (e.g., by a factor of two) to reconstruct the digital image. Each layer of the encoder of encoder module 146 performs convolutions, and each layer of the decoder of decoder module 154 performs deconvolutions using spatial filters.

Weights of the spatial filters in the encoder and the decoder can be obtained in any suitable way. In one example, training module 156 trains the encoder, decoder, or both encoder and decoder by adjusting the weights of the spatial filters to minimize a training loss. Additionally or alternatively, an encoder of encoder module 146 may include a pre-trained neural network such as a visual geometry group (VGG) convolutional neural network. In one example, an encoder of encoder module 146 includes a VGG-19 network to extract features of a digital image, as described in "Very deep convolutional networks for large-scale image recognition", arXiv, 1409.1556, 2014, by K. Simonyan and A. Zisserman, the disclosure of which is incorporated herein by reference in its entirety.

Encoder module 146 can generate any suitable feature map for a digital image. For instance, encoder module 146 can generate a feature map by extracting features from any suitable layer of an encoder. In one example, encoder module 146 generates respective vectorized feature maps for a content image and a style image, such as content image 108 and style image 110. For instance, encoder module 146 may separately process the content image 108 and the style image 110 and generate a content feature map for the content image 108 and a style feature map for the style image 110.

In one example, encoder module 146 extracts features of a content image (e.g., content image 108) into a content feature map $$f_c = \mathfrak{R}^{C \times H_c W_c}$$

where $H_c$ is the height of the features of the content image (e.g., the height of the content image) and $W_c$ is the width of the features of the content image (e.g., the width of the content image). Encoder module 146 also extracts features of a style image (e.g., style image 110) into a style feature map $$f_s = \mathfrak{R}^{C \times H_s W_s}$$

where $H_s$ is the height of the features of the style image (e.g., the height of the style image) and $W_s$ is the width of the features of the style image (e.g., the width of the style image).

Feature maps generated by encoder module 146, along with any suitable information, such as a content feature map, a style feature map, encoder weights, encoder parameters (e.g., size of spatial filters, stride of convolutions, number of layers, etc.), an indicator of a network used in an encoder of encoder module 146, such as VGG-19, combinations thereof, and the like, used by or calculated by encoder module 146 are stored in generative network data 130 of storage 126 and made available to modules of image editing application 142. In one example, encoder module 146 provides a content feature map including features extracted from a content image and a style feature map including features extracted from a style image to whitening and coloring module 148, and the style feature map to feature transfer module 150.

Whitening and coloring module 148 is representative of functionality configured to generate a coarse feature map from a content feature map and a style feature map. Whitening and coloring module 148 can generate a coarse feature map from a content feature map and a style feature map in any suitable way. In one example, whitening and coloring module 148 transforms the content feature map so that the results have same covariance statistics as the style feature map. For instance, whitening and coloring module 148 may first whiten the content feature map by applying a linear transformation to the content feature map, and then apply another linear transformation to the whitened results to generate a coarse feature map having covariance statistics that match the covariance statistics of the style feature map.

The covariance statistics of the content feature map $f_c$ can be expressed by the covariance matrix $f_c f_c^T \in \mathfrak{R}^{C \times C}$. In one example, whitening and coloring module 148 subtracts the mean vector of the content feature map from the content feature map by setting $f_c = f_c - m_c$ for mean vector $m_c$. Whitening and coloring module 148 may perform a decomposition of the covariance matrix of the content feature map, such as a singular value decomposition, so that the covariance matrix of the content feature map can be expressed as $$f_c f_c^T = E_c D_c E_c^T$$

where $D_c$ is a diagonal matrix with eigenvalues of the covariance matrix of the content feature map and $E_c$ is a matrix of eigenvectors of the covariance matrix of the content feature map.

Whitening and coloring module 148 transforms the content feature map $f_c$ by applying a linear transformation determined from the decomposition of the covariance matrix of the content feature map to generate a whitened feature map, $$\hat{f}_c = E_c D_c^{-1/2} E_c^T f_c.$$

Here, $E_c D_c^{-1/2} E_c^T$ is a linear transformation that whitens the content feature map $f_c$ so that $\hat{f}_c \hat{f}_c^T = I$. The whitening step helps remove the style of the content image, while preserving the content structure.

Whitening and coloring module 148 generates a coarse feature map $f_{coarse}$ from the whitened feature map $\hat{f}_c$ by applying a linear transformation to the whitened feature map that sets the covariance matrix of the coarse feature map $f_{coarse}$ to match the covariance matrix of the style feature map $f_s$. For instance, whitening and coloring module 148 may subtract the mean vector of the style feature map from the style feature map by setting $f_s = f_s - m_s$ for mean vector $m_s$. Whitening and coloring module 148 performs a decomposition of the covariance matrix of the style feature map (e.g., with the mean vector removed), such as a singular value decomposition. Hence, whitening and coloring module 148 may represent the covariance matrix of the style feature map as $$f_s f_s^T = E_s D_s E_s^T$$

where $D_s$ is a diagonal matrix with eigenvalues of the covariance matrix of the style feature map and $E_s$ is a matrix of eigenvectors of the covariance matrix of the style feature map.

Whitening and coloring module 148 applies a linear transformation determined from the decomposition of the covariance matrix of the style feature map to the whitened color map to generate a coarse feature map, $$f_{coarse} = E_s D_s^{-1/2} E_s^T \hat{f}_c.$$

Here, $E_s D_s^{-1/2} E_s^T$ is a linear transformation that colors the whitened feature map $\hat{f}_c$ so that the coarse feature map has the same covariance matrix as the style feature map, $f_{coarse} f_{coarse}^T = f_s f_s^T$. In one example, whitening and coloring module 148 adds the mean vector of the style feature map to the coarse feature map by setting $f_{coarse} = f_{coarse} + m_s$.

A coarse feature map generated by whitening and coloring module 148, along with any suitable information, such as a content feature map, style feature map, whitened feature map, decompositions, linear transformations, eigenvalues, eigenvectors, covariance matrices, combinations thereof, and the like, used by or calculated by whitening and coloring module 148 are stored in transform data 132 of storage 126 and made available to modules of image editing application 142. In one example, whitening and coloring module 148 provides a coarse feature map to feature transfer module 150 and feature fusion module 152.

Feature transfer module 150 is representative of functionality configured to generate a fine feature map from a coarse feature map generated by whitening and coloring module 148 and a style feature map generated by encoder module 146. Feature transfer module 150 can generate a fine feature map in any suitable way. In one example, feature transfer module 150 swaps feature from the style feature map into the coarse feature map to generate a fine feature map. For instance, feature transfer module 150 may determine patches of the style feature that match patches of the coarse feature map (e.g., according to a similarity measure), and replace the patches of the coarse feature map with the patches of the style feature map. This patch swapping process may be performed iteratively, to make full use of the style features and enhance the generalization ability of image editing system 106, as described in more detail in FIG. 2.

Figure 2:
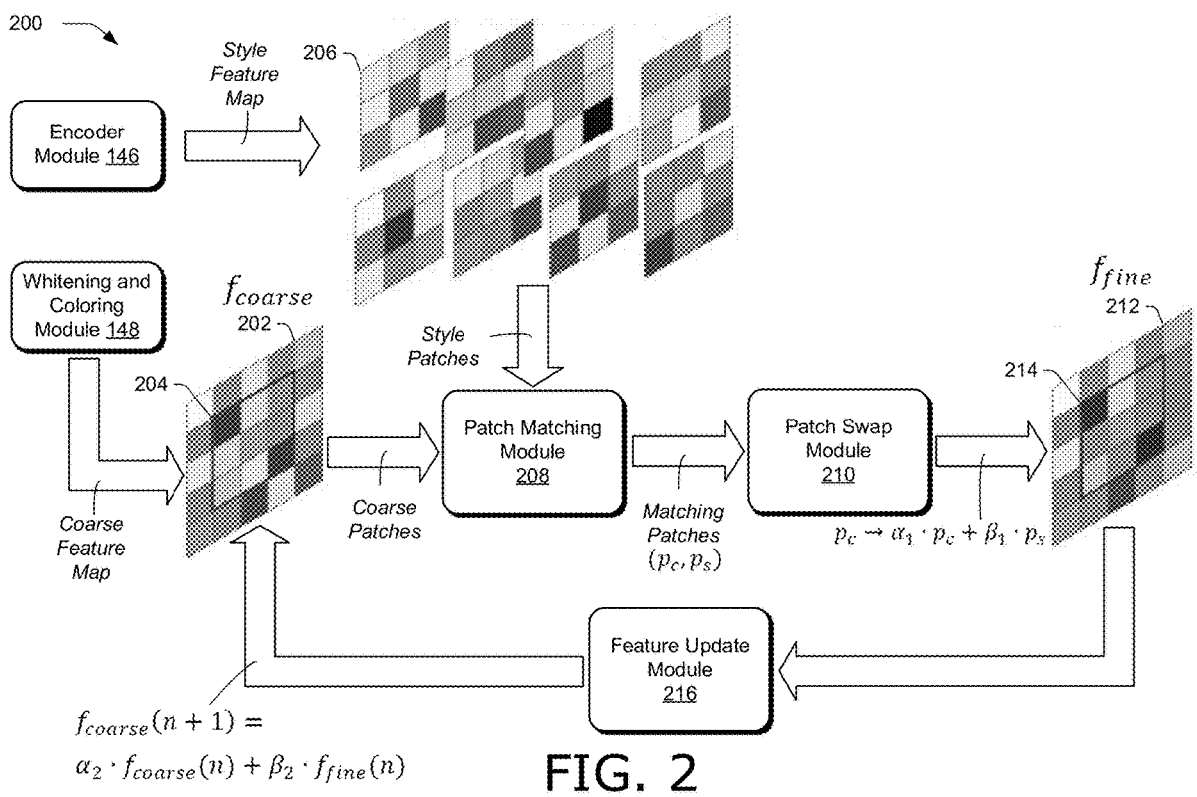
FIG. 2 illustrates an example feature transfer module in accordance with one or more aspects of the disclosure.

FIG. 2 illustrates an example feature transfer module 200 in accordance with one or more aspects of the disclosure. Feature transfer module 200 is an example of feature transfer module 150 in FIG. 1. Feature transfer module 200 receives a coarse feature map 202 from whitening and coloring module 148 and a style feature map from encoder module 146. In the example in FIG. 2, a 3×3 patch 204 of coarse feature map 202 is illustrated. Though a 3×3 patch size is illustrated in FIG. 2, patch 204 can be of any suitable size. In one example, the size of patch 204 is user configurable, such as via a selection of a user interface exposed by user interface module 144. Moreover, patch 204 is illustrated as a single 3×3 patch for clarity. Feature transfer module 200 may, however, process any suitable number of patches of the coarse feature map 202 at an iteration. For instance, feature transfer module 200 may determine overlapping patches of the coarse feature map 202, such as a plurality of overlapping 3×3 patches spanning the entirety of the coarse feature map 202, and analyze at each iteration each of the overlapping patches to determine if a patch from the style feature map matches a patch of the coarse feature map.

Feature transfer module 200 receives the style feature map from encoder module 146, and based on the size of patch 204, determines style patches 206 of the style feature map from encoder module 146. Feature transfer module 200 may determine any suitable style patches 206, such as overlapping patches of the style feature map from encoder module 146 that match the size of patch 204. In one example, style patches 206 include a complete set of overlapping patches of the style feature map, in the sense that the style patches 206 include all patches of the style feature map having a same size as patch 204.

Feature transfer module 200 includes patch matching module 208. Patch matching module 208 receives the style patches 206 and patch 204 of the coarse feature map 202, and determines whether the style patches 206 include a patch that matches the patch 204. Patch matching module 208 can determine matching patches in any suitable way. In one example, patch matching module 208 determine matching patches based on a similarity measure between pairs of patches (e.g., patch 204 and one of the style patches 206). For instance, patch matching module 208 may compare each of the style patches 206 to the patch 204 and determine a respective similarity score for each of the style patches 206, such as based on a similarity measure. Patch matching module 208 can use any suitable similarity measure, such as cosine similarity measure. Patch matching module 208 may rank the style patches 206 based on their similarity measures, and select the highest ranking of the style patches 206 as a matching patch to patch 204.

In one example, patch matching module 208 requires that the similarity measure between the patch of style patches 206 and the patch 204 satisfies a threshold condition to be designated a pair of matching patches. For instance, patch matching module 208 may require that a pair of patches has a similarity measure greater than a threshold similarity value (e.g., greater than 0.7 for a normalized similarity measure between zero and one) to be designated a pair of matching patches. Patch matching module 208 provides a pair of matching patches ($p_c$, $p_s$) to patch swap module 210, e.g., $p_c$ denotes patch 204 of the coarse feature map 202, and $p_s$ dentotes one of style patches 206 determined by patch matching module 208 to match the patch 204.

Feature transfer module 200 includes patch swap module 210 configured to generate fine feature map 212 based on the coarse feature map 202 from whitening and coloring module 148 and the style feature map from encoder module 146. Accordingly, patch swap module 210 receives pairs of matching patches from patch matching module 208, and transfers features of the style feature map into the coarse feature map 202 to generate fine feature map 212. Hence, fine feature map 212 may be of a same size of the coarse feature map 202.

Patch swap module 210 can transfer features of the style feature map into the coarse feature map 202 and generate fine feature map 212 in any suitable way. For instance, patch swap module 210 may replace the patch 204 of the coarse feature map 202 with a patch determined from the pair of matching patches ($p_c$, $p_s$) provided from patch matching module 208. In one example, patch swap module 210 replaces the patch 204 (denoted by $p_c$) with a linear combination of the patch 204 and the matching patch of the style patches 206 (denoted by $p_s$). This patch swapping with blended patches is represented by $$p_c \rightarrow \alpha_1 p_c + \beta_1 p_s$$

where $\alpha_1$ and $\beta_1$ are combining weights, which may be user selectable via a user interface of user interface module 144. The resulting patch is represented by patch 214 of fine feature map 212. In one example, the combining weight $\alpha_1$ is set to zero, and the combining weight $\beta_1$ is set to one, so that the matching patch $p_s$ from style patches 206 is swapped into to the coarse feature map 202 without blending to generate the fine feature map 212.

Feature transfer module 200 generates the fine feature map 212 iteratively. Hence, feature transfer module 200 includes feature update module 216, which receives the fine feature map 212 from patch swap module 210 and generates an updated coarse feature map based on the fine feature map 212 for use in a next iteration. For instance, feature update module 216 generates an updated coarse feature map from a linear combination of the coarse feature map 202 and the fine feature map 212, $$f_{coarse}(n+1) = \alpha_2 f_{coarse}(n) + \beta_2 f_{fine}(n).$$

Here, n+1 denotes a next iteration and n denotes a current iteration, and $\alpha_2$ and $\beta_2$ are combining weights, which may be user selectable via a user interface of user interface module 144.

In the next iteration, the updated coarse feature map $f_{coarse}(n+1)$ from feature update module 216 is used in place of the coarse feature map 202 illustrated in FIG. 2. For instance, in the next iteration, patch matching module 208 determines pairs of matching patches, each pair including a patch from the updated coarse feature map $f_{coarse}(n+1)$ and a patch from the style patches 206 determined to match the patch of the updated coarse feature map. Patch swap module 210 generates a new version of the fine feature map 212 from the updated coarse feature map and pairs of matching patches, by swapping patches as previously described.

Feature transfer module 200 may iteratively generate the fine feature map 212 for any suitable number of iterations. In one example, feature transfer module 200 iteratively generates the fine feature map 212 until no more patches of the style patches 206 can be found to match a patch of an updated coarse feature map. For instance, the similarity measures for all of the style patches 206 are below a threshold similarity score, so that patch matching module 208 returns no matching pairs of patches. Additionally or alternatively, feature transfer module 200 may iteratively generate the fine feature map 212 for a prescribed number of iterations, such as a user-selectable number of iterations via a user interface exposed by user interface module 144.

Returning to FIG. 1, a fine feature map generated by feature transfer module 150, along with any suitable information, such as similarity measures, a ranking of similarity scores, patch sizes, pairs of matching patches, updated coarse feature maps, combining weights, a number of iterations used to generate a fine feature map, a number of style patches, combinations thereof, and the like, used by or calculated by feature transfer module 150 are stored in feature data 134 of storage 126 and made available to modules of image editing application 142. In one example, feature transfer module 150 provides a fine feature map to feature fusion module 152.

Feature fusion module 152 is representative of functionality configured to fuse feature maps. In one example, feature fusion module 152 fuses a coarse feature map generated by whitening and coloring module 148 and a fine feature map generated by feature transfer module 152. By fusing feature maps, feature fusion module 152 generates a fused feature map.

Feature fusion module 152 can fuse feature maps in any suitable way. In one example, feature fusion module 152 fuses feature maps by concatenating the feature maps. For instance, feature fusion module 152 may concatenate a coarse feature map and a fine feature map along channel dimensions of a decoder of decoder module 154 to form a fused feature map, $f_{fused}$.

Additionally or alternatively, feature fusion module 152 may fuse feature maps by combining the feature maps, such as by forming a linear combination of the feature maps, e.g., $f_{fused} = \alpha_3 \cdot f_{coarse} + \beta_3 \cdot f_{fine}$, where $f_{coarse}$ denotes a coarse feature map generated by whitening and coloring module 148, $f_{fine}$ denotes a fine feature map generated by feature transfer module 152, and $\alpha_3$ and $\beta_3$ are combining weights that may be user selectable via a user interface of user interface module 144.

A fused feature map generated by feature fusion module 152, along with any suitable information, such as combining weights, indicators of channel dimensions, concatenation results, combinations thereof, and the like, used by or calculated by feature fusion module 152 are stored in feature data 134 of storage 126 and made available to modules of image editing application 142. In one example, feature fusion module 152 provides a fused feature map to decoder module 154.

Decoder module 154 is representative of functionality configured to generate a digital image from one or more feature maps. Decoder module 154 can generate a digital image from a feature map in any suitable way. In one example, decoder module 154 includes a decoder that is complementary to an encoder of encoder module 146. For instance, a decoder of decoder module 154 may pass a feature map through a series of layers that progressively upsample (e.g., by a factor of two) to enlarge the feature map at each layer and reconstruct a digital image. Each layer of the decoder of decoder module 154 performs deconvolutions using spatial filters. In one example, the decoder of decoder module 154 is symmetric to a VGG-19 network as previously described, up to a designated layer.

Weights of spatial filters in the decoder of decoder module 154 can be determined in any suitable way. In one example, training module 156 trains decoder module 154 by adjusting the weights of spatial filters according to a training loss term (discussed below in more detail). The weights of spatial filters in a decoder of decoder module 154 may be adjusted jointly with weights of an encoder of encoder module 146 or separately from the weights of an encoder of encoder module 146. In one example, weights of an encoder of encoder module 146 are fixed (e.g., pre-trained), and the weights of spatial filters in a decoder of decoder module 154 are adjusted without adjusting the weights of the encoder of encoder module 146.

In one example, decoder module 154 generates a digital image from a fused feature map provided by feature fusion module 152. Accordingly, decoder module 154 generates a digital image having content of a content image in the style of a style image. For instance, the output image 112 is an example of a digital image generated by decoder module 154, which includes the content of the content image 108 in the style of the style image 110.

A digital image generated by decoder module 154, along with any suitable information, such as fused feature maps, weights of spatial filters, loss terms, upsample factors, numbers of neural layers, combinations thereof, and the like, used by or calculated by decoder module 154 are stored in generative network data 130 of storage 126 and made available to modules of image editing application 142. In one example, decoder module 154 provides a digital image to user interface module 144, which exposes the digital image in a user interface.

Training module 156 is representative of functionality configured to train image editing system 106. Training module 156 can train any suitable module of image editing system 106 in any suitable way. In one example, training module 156 adjusts weights of an encoder of encoder module 146, weights of a decoder of decoder module 154, or both weights of an encoder of encoder module 146 and weights of a decoder of decoder module 154. Training module 156 adjusts weights based on a training loss function that includes a content loss and a style loss term, $$\mathcal{L} = \mathcal{L}_c + \lambda \cdot \mathcal{L}_s$$

where $\mathcal{L}_c$ denotes the content loss term and $\mathcal{L}_s$ denotes the style loss term. The parameter $\lambda$ is a style loss combining weight. In one example, $\lambda \in [0,1]$.

The content loss term, $\mathcal{L}_c$, is a measure of the difference between features of the content image and the features of the output image generated by decoder module 154. Accordingly, training module 156 includes a feature extractor to extract features of images, such as a VGG-19 network. In one example, the content loss term is expressed as $$\mathcal{L}_c = \| \mathcal{F}(I_o) - \mathcal{F}(I_c) \|_2$$

where $\mathcal{F}_{(\circ)}$ denotes features extracted by a feature extractor of training module 156, $I_c$ denotes a content image (e.g., content image 108), and $I_o$ denotes an output image generated by image editing system 106 (e.g., output image 112).

The style loss term, $\mathcal{L}_s$, is a measure of the differences in mean and standard deviation between features of the style image and features of the output image generated by decoder module 154. In one example, the style loss term is expressed as $$\mathcal{L}_s = \sum_{i=1}^{L} \| \mu(\phi_i(I_o)) - \mu(\phi_i(I_s)) \|_2 + \sum_{i=1}^{L} \| \sigma(\phi_i(I_o)) - \sigma(\phi_i(I_s)) \|_2$$

where $\mu$ and $\sigma$ denote mean and standard deviation, respectively, $I_s$ denotes a style image (e.g., style image 110), and $\phi_i$ denotes the i-th layer of a feature extractor of training module 156 (e.g., VGG-19).

Training module 156 can train image editing system 106 using any suitable images. In one example, training module 156 uses a training dataset to train image editing system 106. A training dataset can include a database of digital photographs used as content images, and a database of digital representations of paintings used as style images.

Training module 156 can adjust weights of image editing system 106 (e.g., weights of an encoder, weights of a decoder, or both weights of an encoder and weights of a decoder) to minimize the training loss function $\mathcal{L}$ in any suitable way. In one example, training module 156 adjusts weights iteratively, such as via a stochastic gradient descent of the training loss function. Accordingly, training module 156 generates training updates at each iteration and provides the training updates to image editing system 106, which adjusts weights based on the training updates to minimize the training loss function over a number of training iterations.

Training updates generated by training module 156, along with any suitable information, such as a training loss, content loss term, style loss term, weights of spatial filters, number of training iterations, means, standard deviations, style loss combining weights, training images (e.g., content images, style images, and output images generated from the content images and the style images by image editing system 106), combinations thereof, and the like, used by or calculated by training module 156 are stored in training data 136 of storage 126 and made available to modules of image editing application 142. In one example, training module 156 provides training updates to decoder module 154.

Having considered an example digital medium environment, consider now a discussion of an example system usable to transfer image style to content of a digital image in accordance with one or more aspects of the disclosure.

Example Image Editing System

Figure 3:
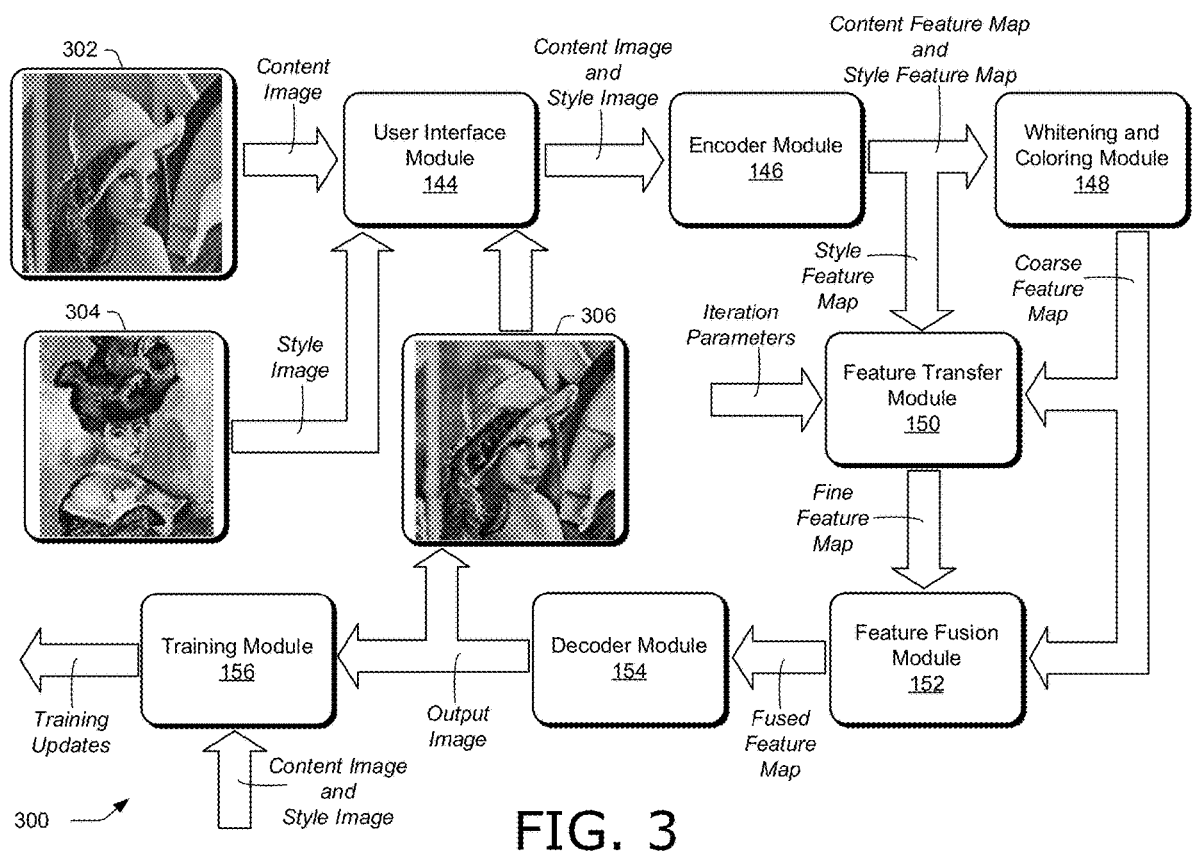
FIG. 3 illustrates an example system usable to transfer image style to content of a digital image in accordance with one or more aspects of the disclosure.

FIG. 3 illustrates an example system 300 usable to transfer image style to content of a digital image in accordance with one or more aspects of the disclosure. In this implementation, system 300 includes the modules of image editing application 142 as described in FIG. 1, e.g., user interface module 144, encoder module 146, whitening and coloring module 148, feature transfer module 150, feature fusion module 152, decoder module 154, and training module 156. System 300 is one example of image editing system 106 that can be constructed using the modules of image editing application 142. For instance, signals can be redefined, and modules can be modified, combined, divided, added, or removed to form a modified system, without altering the functionality of system 300. Accordingly, such modified systems are considered to be within the scope of the disclosure.

Furthermore, for simplicity, system 300 is limited to the modules of image editing application 142 and a description of some of their interconnects. System 300 can, however, include any suitable signals and communications between modules omitted for simplicity. Such signals may include system clocks, counters, image indicators, sequence indicators, combining weights, reset signals, and the like. In one example, system 300 can operate in real time (e.g., with no perceptible delay to a user). Accordingly, signals can be calculated by the modules of system 300 and communicated between the modules of system 300 without significant delay, so that an image may be edited and the results exposed in a user interface without perceptible delay to a user. For instance, style from a style image may be transferred to content of a content image to generate an output image without perceptible delay to a user.

Moreover, system 300 can be implemented on any suitable device or devices. In one example, system 300 is implemented on one computing device (e.g., computing device 104 in FIG. 1). In another example, system 300 is implemented on more than one computing device. For instance, parts of system 300 can be implemented by a first computing device, such as one computing device of computing device 104 in FIG. 1, and other parts of system 300 can be implemented by an additional computing device or devices, such as another computing device of computing device 104. In one example, a server implements parts of system 300, such as server 116 in FIG. 1. A server can be remote, e.g., because it is not collocated with the first computing device. A server may be configured to receive signals of system 300 from a computing device (e.g., computing device 104), process the received signals, such as with image editing support system 118, and transmit results of the processing back to the computing device. Hence, image editing support system 118 of server 116 in FIG. 1 may include an instantiation of system 300.

Additionally or alternatively, parts of system 300 can be implemented by an additional computing device that is collocated with a first computing device. For instance, one device of computing device 104 may be a first computing device, and another device of computing device 104 may be an additional, collocated computing device. The first computing device and the additional computing device may be operated by one or more users. Hence, system 300 provides for multiple users within an environment to share data included in system 300.

System 300 obtains content image 302 and style image 304, and generates output image 306, in which the style of the style image 304 is transferred to the content of the content image 302. System 300 can obtain the content image 302 and the style image 304 in any suitable way. In one example, a user provides the content image 302 and the style image 304, such as by selecting thumbnail representations of the images in a user interface of user interface module 144, or loading the content image 302 and the style image 304 into system 300 from memory. Additionally or alternatively, system 300 can obtain the content image 302 and the style image 304 from a database of images, such as a training dataset of images used to train one or more modules of system 300 (e.g., from a database hosted by a server).

The content image 302 and the style image 304 are provided to user interface module 144. For instance, user interface module 144 may expose the content image 302 and the style image 304 in a user interface. In one example, a user enables system 300 to transfer the style of the style image 304 into the content of the content image 302, such as by selecting an option exposed in a user interface of user interface module 144 (e.g., a "transfer now" button). The content image 302 and the style image 304 are provided to encoder module 146.

Encoder module 146 receives the content image 302 and the style image 304, and generates respective feature maps for the images. For instance, encoder module 146 may separately process the content image 302 and the style image 304 to generate a content feature map for the content image 302 and a style feature map for the style image 304. In one example, encoder module 146 includes an encoder to extract features of digital images into feature maps, such as a pre-trained network (e.g., VGG-19). Encoder module 146 provides a content feature map generated from the content image 302 and a style feature map generated from the style image 304 to whitening and coloring module 148, and also provides the style feature map to feature transfer module 150.

Whitening and coloring module 148 receives a content feature map and a style feature map from encoder module 146, and generates a coarse feature map. In one example, whitening and coloring module 148 generates a coarse feature map so that its covariance statistics (e.g., covariance matrix) matches the covariance statistics of the style feature map. For instance, whitening and coloring module 148 may apply a first linear transformation to the content feature map to whiten the content feature map, and apply a second linear transformation to the results of the whitening to color the coarse feature map. The first linear transformation may be determined from a decomposition of the covariance matrix of the content feature map, and the second transformation may be determined from a decomposition of the covariance matrix of the style feature map. Whitening and coloring module 148 provides a coarse feature map to feature transfer module 150 and feature fusion module 152.

Feature transfer module 150 receives a style feature map from encoder module 146 and a coarse feature map from whitening and coloring module 148, and generates a fine feature map. Feature transfer module 150 generates a fine feature map by transferring features from the style feature map into the coarse feature map. In one example, feature transfer module 150 iteratively swaps patches determined from the style feature map with patches of the coarse feature map to generate a fine feature map. For instance, at each iteration, feature transfer module 150 may blend patches of the coarse feature map with patches of the style feature map determined to match the patches of the coarse feature map (e.g., according to a similarity measure). Feature transfer module 150 may replace the patches of the coarse feature map with the blended patches, resulting in a fine feature map at each iteration. Additionally or alternatively, feature transfer module 150 may blend the fine feature map and the coarse feature map to form an updated coarse feature map for use in a next iteration. Blending patches or feature maps may be done with combining weights, such as user-selectable combining weights.

In one example, feature transfer module 150 iteratively generates a fine feature map until a termination condition is met. For instance, feature transfer module 150 may iterate the fine feature map until feature transfer module 150 determines that no more patches of the style feature map match patches of the updated coarse feature map. Additionally or alternatively, a termination condition may include that a minimum number of iterations is to be performed. Accordingly, feature transfer module 150 receives iteration parameters to control the transfer of style features to the coarse feature map. Iteration parameters can include any suitable parameter, such as a minimum number of iterations to be performed, a similarity threshold value to determine whether patches match, combining weights, and the like.

By iteratively transferring style features to the coarse feature map, feature transfer module 150 makes full use of the patterns of the style features. Furthermore, by blending patches, feature maps, or both patches and feature maps, feature transfer module 150 can avoid directly transferring style features that may result in undesirable image artifacts. Feature transfer module 150 provides a fine feature map to feature fusion module 152.

Feature fusion module 152 receives a fine feature map from feature transfer module 150 and a coarse feature map from whitening and coloring module 148, and fuses the fine feature map and the coarse feature map to form a fused feature map. Feature fusion module 152 can fuse the fine feature map and coarse feature map in any suitable way. In one example, feature fusion module 152 fuses the fine feature map and the coarse feature map by concatenating the fine feature map and the coarse feature map along channel dimensions of a decoder of decoder module 154. Feature fusion module 152 provides the fused feature map to decoder module 154.

Decoder module 154 receives the fused feature map from feature fusion module 152, and generates an output image having the content of the content image 302 in the style of the style image 304. In one example, decoder module 154 includes a decoder that is complementary to an encoder of encoder module 146. For instance, the decoder may include layers that progressively upsample feature maps and perform deconvolutions with spatial filters, whereas the encoder progressively downsamples and performs convolutions at layers of the encoder of encoder module 146.

In the example in FIG. 3, decoder module 154 generates the output image 306, which depicts the woman illustrated in content image 302, in the style of the painting depicted in style image 304. Decoder module 154 provides the output image 306 to user interface module 144, which exposes the output image 306 in a user interface. In one example, decoder module 154 provides an output image (e.g., output image 306) to training module 156.

Training module 156 receives an output image generated by decoder module 154 (e.g., the output image 306), and content and style images used to generated the output image (e.g., the content image 302 and the style image 304). Using these images, training module 156 generates training updates. For instance, training module 156 may generate training updates that minimize a training loss, such as a training loss that includes a content loss term and a style loss term generated from features extracted from the images, as previously described. In one example, training module 156 provides training updates to decoder module 154 to update weights of a decoder, such as weights of spatial filters used to perform deconvolutions. Additionally or alternatively, training module 156 may provide training updates to encoder module 146 to update weights of an encoder, such as weights of spatial filters used to perform convolutions.

The systems described herein constitute an improvement over systems that require transformations for multiple passes of encoding and decoding. Rather, the systems described herein perform whitening and coloring for a single pass of encoding and decoding. Accordingly, the systems described herein can operate with low processing delay and require low memory and processor resources, so that they support real-time operation and can be implemented on devices with limited resources. Furthermore, by iteratively transferring style features to a coarse feature map that is generated via whitening and coloring, the systems described herein fully and robustly transfer style features of the style image to the coarse feature map. Hence, the systems described herein can generalize to unseen style classes without introducing undesired distortion, unlike systems that directly copy style features and are limited to seen style classes.

Having considered an example system usable to transfer image style to content of a digital image, consider now a discussion of example images in accordance with one or more aspects of the disclosure.

Example Images

Figure 4:
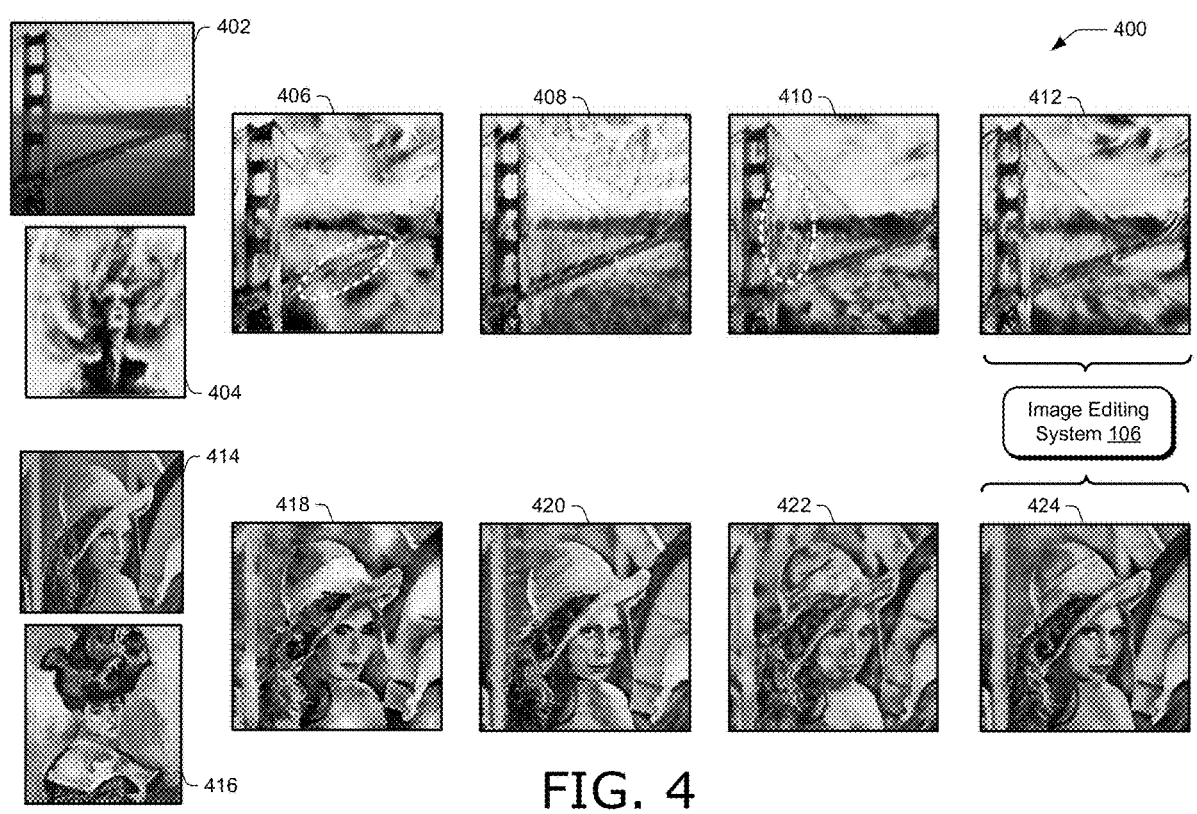
FIG. 4 illustrates example images in accordance with one or more aspects of the disclosure.

FIG. 4 illustrates example images 400 in accordance with one or more aspects of the disclosure. Images 400 include output images generated for two sets of content images and style images. For instance, for content image 402 and style image 404, images 400 include output image 406, output image 408, output image 410, and output image 412. Moreover, for content image 414 and style image 416, images 400 include output image 418, output image 420, output image 422, and output image 424.

Output image 412 and output image 424 are generated by image editing system 106. The other output images of images 400, however, are not generated by image editing system 106. For instance, output image 406 and output image 418 are generated with the systems described in "Universal style transfer via feature transforms" in the proceedings of the 31$^{st}$ Conference on Neural Information Processing Systems, Long Beach, Calif., 2017, by Y. Li et al. Output image 408 and output image 420 are generated with the systems described in "Arbitrary style transfer in real-time with adaptive instance normalization" in ICCV 2017, by X. Huang and S. Belongie. Output image 410 and output image 422 are generated with the systems described in "Arbitrary style with deep feature reshuffle" in CVPR 2018, by S. Gu et al.

Output image 412 and output image 424 generated by image editing system 106 as described herein are an improvement over the other output images not generated by image editing system 106, because the other output images introduce undesirable distortions. For instance, output image 406 introduces artifacts and loss of structure to the bridge (see the white ellipse overlaid on output image 406). Output image 408 does not accurately transfer the style of style image 404 to the content of content image 402. Output image 410 includes facial features (see the white ellipse overlaid on output image 410) directly copied from style image 404, which results in an inappropriate background in output image 410.

Furthermore, each of output image 418, output image 420, and output image 422 distorts the woman's facial features, while output image 424 generated by image editing system 106 accurately depicts the woman of content image 414 with the style of style image 416. Accordingly, image editing system 106 more accurately transfers the style of a style image to the content of a content image than the other systems used to generate output images 406-410 and 418-422.

Having considered example images, consider now a discussion of example procedures for transferring image style to content of a digital image in accordance with one or more aspects of the disclosure.

Example Procedures

Figure 5:
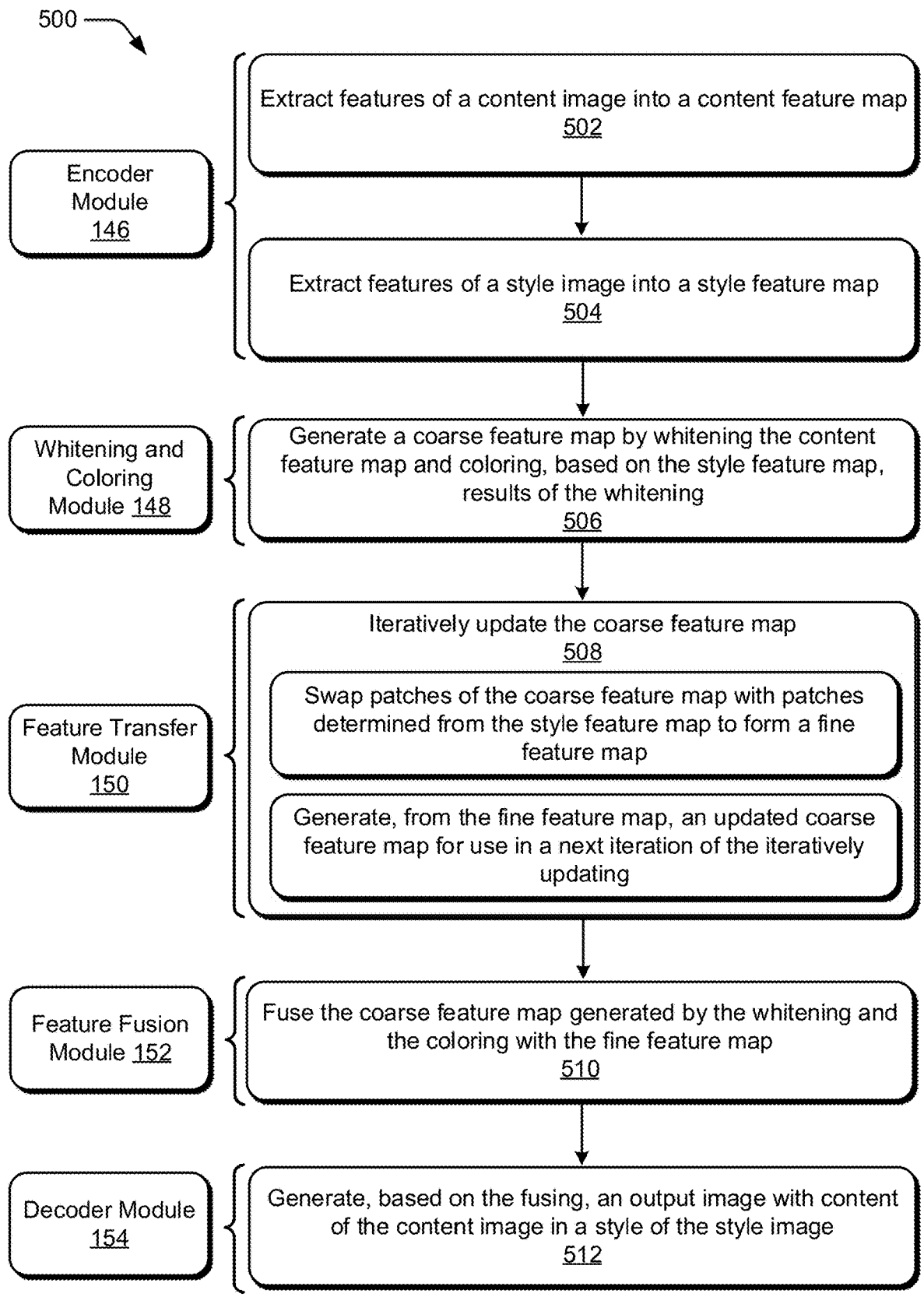
FIG. 5 illustrates a flow diagram depicting an example procedure in accordance with one or more aspects of the disclosure.

FIG. 5 illustrates an example procedure 500 for transferring image style to content of a digital image in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 104 or server 116 of FIG. 1 that makes use of an image editing system, such as system 300 or image editing system 106. An image editing system implementing procedure 500 may be an independent application that has been installed on the computing device, a service hosted by a service provider that is accessible by the computing device, a plug-in module to the computing device, or combinations thereof.

Features of a content image are extracted into a content feature map (block 502). In one example, encoder module 146 extracts features of a content image into a content feature map. For instance, encoder module 146 may include an encoder to extract features of digital images, such as VGG-19. The encoder may be pre-trained.

Features of a style image are extracted into a style feature map (block 504). In one example, encoder module 146 extracts features of a style image into a style feature map. Encoder module 146 may separately process the content image and the style image to generate the content feature map and the style feature map.

A coarse feature map is generated by whitening the content feature map and coloring, based on the style feature map, results of the whitening (block 506). In one example, whitening and coloring module 148 generates the coarse feature map by whitening the content feature map and coloring, based on the style feature map, results of the whitening. Additionally or alternatively, generating the coarse feature map can include matching a covariance matrix of the coarse feature map and a covariance matrix of the style feature map.

In one example, whitening includes applying a first linear transformation to the content feature map and coloring includes applying a second linear transformation to the results of the whitening. The first linear transformation can be determined from a decomposition of a covariance matrix of the content feature map and the second linear transformation can be determined from a decomposition of a covariance matrix of the style feature map. The decompositions can include a matrix of eigenvectors and a diagonal matrix with eigenvalues of a covariance matrix.

The coarse feature map is iteratively updated (block 508). In one example, feature transfer module 150 iteratively updates the coarse feature map. Iteratively updating the coarse feature map includes swapping patches of the coarse feature map with patches determined from the style feature map to form a fine feature map, and generating, from the fine feature map, an updated coarse feature map for use in a next iteration of the iteratively updating.

In one example, iteratively updating the coarse feature map includes matching the patches of the coarse feature map to corresponding patches of the style feature map based on a similarity measure to determine the patches determined from the style feature map. Additionally or alternatively, iteratively updating the coarse feature map can include linearly combining the patches of the coarse feature and the corresponding patches of the style feature map to determine the patches determined from the style feature map. For instance, the patches of the coarse feature and the corresponding patches may be blended to form blended patches that are swapped into the coarse feature map at each iteration.

In one example, iteratively updating the coarse feature map is repeated until the similarity measure between the patches of the coarse feature map and the corresponding patches of the style feature map is below a threshold similarity. The similarity measure being below a threshold similarity indicates that the patches do not match.

Additionally or alternatively, iteratively updating the coarse feature map includes linearly combining the coarse feature map and the fine feature map to generate the updated coarse feature map. For instance, a user may select combining weights in a user interface to linearly combine the coarse feature map and the fine feature map and generate the updated coarse feature map.

The coarse feature map generated by the whitening and the coloring is fused with the fine feature map (block 510). In one example, feature fusion module 152 fuses the coarse feature map generated by the whitening and the coloring with the fine feature map. For instance, feature fusion module 152 may generate a fused feature map by fusing the coarse feature map generated by whitening and coloring module 148 with the fine feature map generated by feature transfer module 150.

In one example, fusing the coarse feature map with the fine feature map includes concatenating the fine feature map and the coarse feature map generated by the whitening and the coloring along a channel dimension of a decoder that generates the output image. Additionally or alternatively, fusing the coarse feature map with the fine feature map can include linearly combining the coarse feature map and the fine feature map. Fusing the coarse feature map with the fine feature map generates a fused feature map.

Based on the fusing, an output image with content of the content image and a style of the style image is generated (block 512). In one example, decoder module 154 generates, based on the fusing, an output image with content of the content image and a style of the style image. For instance, decoder module 154 may include a decoder to generate an output image with content of the content image and a style of the style image. The decoder may process a fused feature map provided by feature fusion module 152 to generate the output image. In one example, the style of the style image belongs to an unseen style class that is not used when training the decoder.

Figure 6:
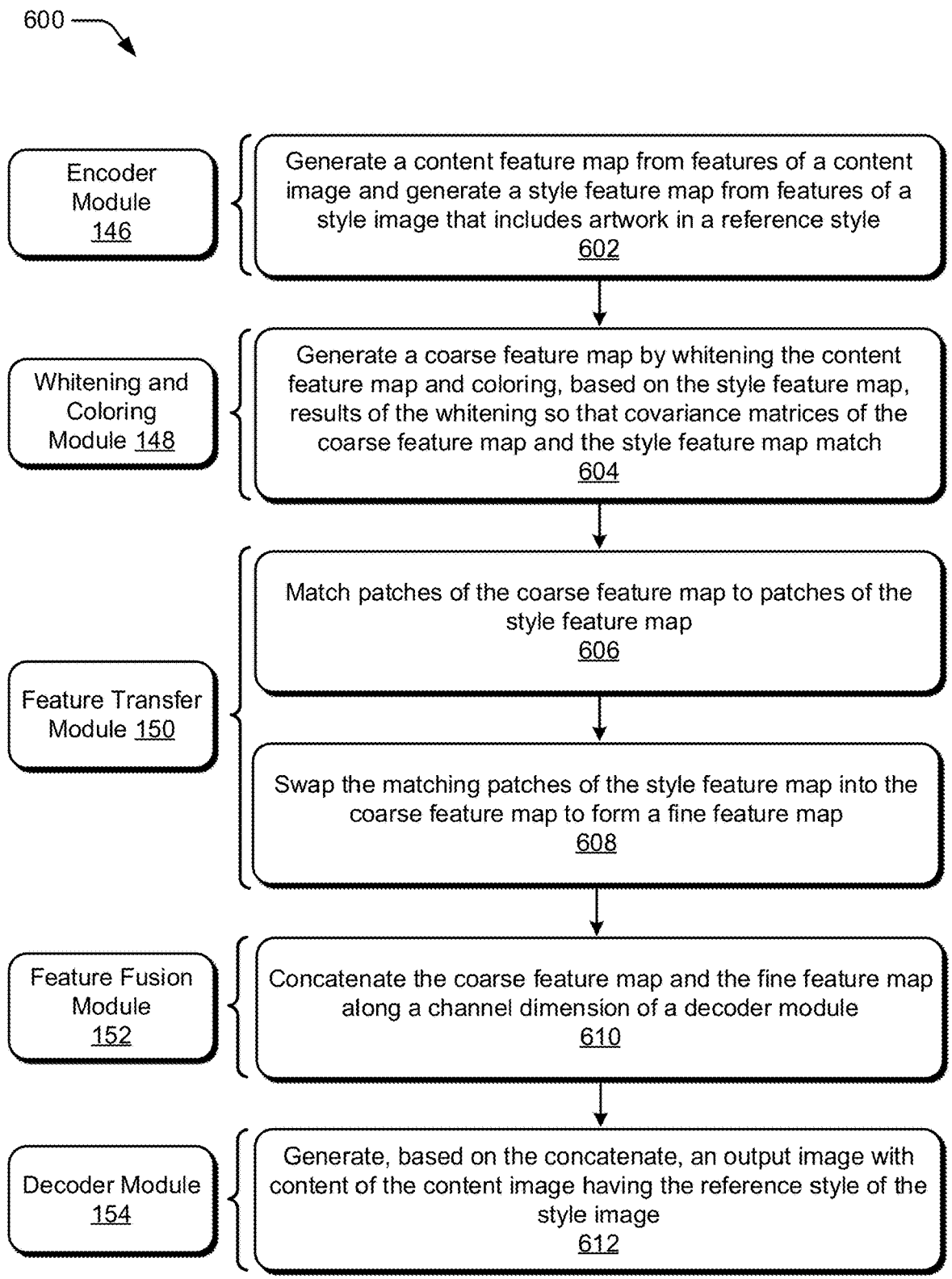
FIG. 6 illustrates a flow diagram depicting an example procedure in accordance with one or more aspects of the disclosure.

FIG. 6 illustrates an example procedure 600 for transferring image style to content of a digital image in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 104 or server 116 of FIG. 1 that makes use of an image editing system, such as system 300 or image editing system 106. An image editing system implementing procedure 600 may be an independent application that has been installed on the computing device, a service hosted by a service provider that is accessible by the computing device, a plug-in module to the computing device, or combinations thereof.

A content feature map is generated from features of a content image and a style feature map is generated from features of a style image that includes artwork in a reference style (block 602). In one example, encoder module 146 generates a content feature map from features of a content image and generates a style feature map from features of a style image that includes artwork in a reference style. For instance, the artwork may be a painting in the style of an artist or group of artists, such as an impressionist style.

A coarse feature map is generated by whitening the content feature map and coloring, based on the style feature map, results of the whitening so that covariance matrices of the coarse feature map and the style feature map match (block 604). In one example, whitening and coloring module 148 generates a coarse feature map by whitening the content feature map and coloring, based on the style feature map, results of the whitening so that covariance matrices of the coarse feature map and the style feature map match.

In one example, whitening and coloring module 148 is configured to determine a first linear transformation from a covariance matrix of the content feature map and a second linear transformation from a covariance matrix of the style feature map. Whitening can include applying the first linear transformation to the content feature map, and coloring can include applying the second linear transformation to the results of the whitening.

Patches of the coarse feature map are matched to patches of the style feature map (block 606). In one example, feature transfer module 150 matches patches of the coarse feature map to patches of the style feature map. Matching may be based on a similarity measure, such as a cosine similarity, and a matching patch from the style feature map may be determined from its similarity measure with a patch from the coarse feature map. For instance, the matching patch may have a highest similarity measure among patches of the style feature map, and the similarity measure may be above a threshold similarity score, such as greater than 0.7 for normalized similarity measures in the range of zero to one.

The matching patches of the style feature map are swapped into the coarse feature map to form a fine feature map (block 608). In one example, feature transfer module 150 swaps the matching patches of the style feature map into the coarse feature map to form a fine feature map. Feature transfer module 150 may match and swap patches iteratively, so that a fine feature map is iteratively generated.

In one example, feature transfer module 150 is configured to repeat matching the patches and swapping the matched patches using an updated coarse feature map determined from the fine feature map until patches of the updated coarse feature map do not match the patches of the style feature map. Feature transfer module 150 may determine that patches of the updated coarse feature map do not match the patches of the style feature map when the similarity scores between the patches are below a threshold similarity score.

Additionally or alternatively, feature transfer module 150 can be further configured to generate, at each iteration, the updated coarse feature map as a linear combination of a previous coarse feature map from a previous iteration and the fine feature map at a current iteration. The linear combination can be based on user-specified combining weights.

In one example, feature transfer module 150 is further configured to generate similarity measures between the patches of the updated coarse feature map and the patches of the style feature map. Feature transfer module 150 compares the similarity measures to a threshold similarity value, and determining the patches of the updated coarse feature map do not match the patches of the style feature map can be based on the comparison of the similarity measures to a threshold similarity value.

Additionally or alternatively, swapping the matching patches can include blending the patches of the coarse feature map with the matching patches of the style feature map to form blended patches. The patches of the coarse feature map can be replaced with the blended patches to form the fine feature map. Blending can include linearly combining the patches of the coarse feature map with the matching patches of the style feature map.

The coarse feature map and the fine feature map are concatenated along a channel dimension of a decoder module (block 610). In one example, feature fusion module concatenates the coarse feature map and the fine feature map along a channel dimension of a decoder module. The concatenated coarse feature map and fine feature map represent a fused feature map.

Based on the concatenation, an output image with content of the content image having the reference style of the style image is generated (block 612). In one example, decoder module 154 generates, based on the concatenation of the coarse feature map and the fine feature map, an output image with content of the content image having the reference style of the style image.

Additionally or alternatively, training module 156 can be configured to determine a loss based on the content image, the style image, and the output image. The loss can include a style loss and a content loss. Training module 156 can adjust weights of at least one of the encoder module or the decoder module based on the loss.

Figure 7:
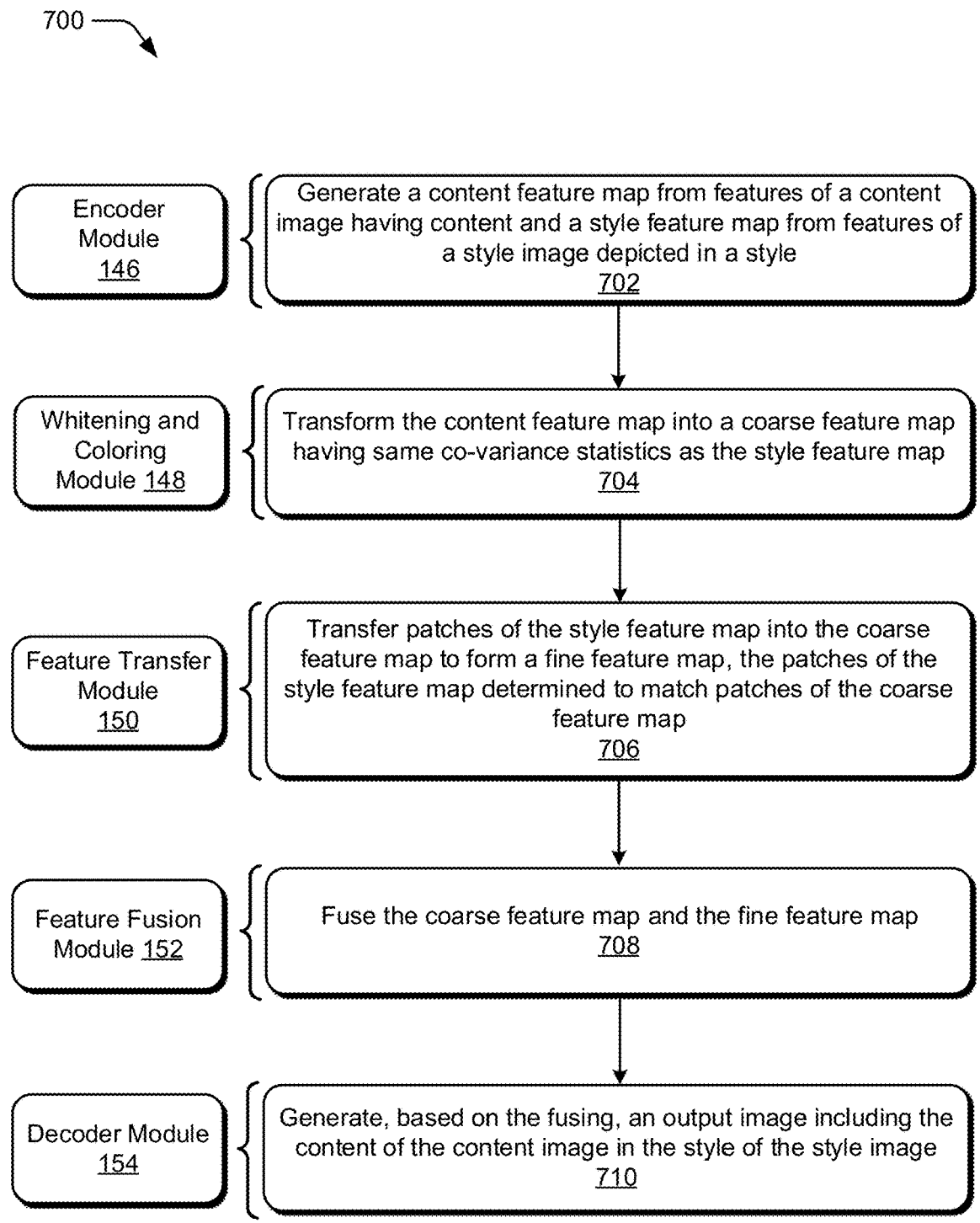
FIG. 7 illustrates a flow diagram depicting an example procedure in accordance with one or more aspects of the disclosure.

FIG. 7 illustrates an example procedure 700 for transferring image style to content of a digital image in accordance with one or more aspects of the disclosure. Aspects of the procedure may be implemented in hardware, firmware, or software, or a combination thereof. The procedure is shown as a set of blocks that specify operations performed by one or more devices and are not necessarily limited to the orders shown for performing the operations by the respective blocks. In at least some aspects, the procedure may be performed in a digital medium environment by a suitably configured computing device, such as one or more of computing device 104 or server 116 of FIG. 1 that makes use of an image editing system, such as system 300 or image editing system 106. An image editing system implementing procedure 700 may be an independent application that has been installed on the computing device, a service hosted by a service provider that is accessible by the computing device, a plug-in module to the computing device, or combinations thereof.

A content feature map is generated from features of a content image having content and a style feature map from features of a style image depicted in a style (block 702). In one example, encoder module 146 generates a content feature map from features of a content image having content and a style feature map from features of a style image depicted in a style.

The content feature map is transformed into a coarse feature map having same covariance statistics as the style feature map (block 704). In one example, whitening and coloring module 148 transforms the content feature map into a coarse feature map having same covariance statistics as the style feature map. For instance, whitening and coloring module 148 may transforms the content feature map into a coarse feature map so that the covariance matrix of the coarse feature map matches the covariance matrix of the style feature map.

In one example, transforming the content feature map into the coarse feature map includes generating a first singular-value decomposition of a covariance matrix of the content feature map and generating a second singular-value decomposition of a covariance matrix of the style feature map. The content feature map can be transformed with a first linear transformation determined from the first singular-value decomposition to form a transformed content feature map. The transformed content feature map can be transformed with a second linear transformation determined from the second singular-value decomposition to form the coarse feature map.

Patches of the style feature map are transferred into the coarse feature map to form a fine feature map, the patches of the style feature map determined to match patches of the coarse feature map (block 706). In one example, feature transfer module 150 transfers patches of the style feature map into the coarse feature map to form a fine feature map, the patches of the style feature map determined to match patches of the coarse feature map.

Additionally or alternatively, transferring the patches of the style feature map can be performed iteratively. For instance, at each iteration an updated coarse feature map is generated based on the fine feature map for use in a next iteration, in which at least one patch of the style feature map is transferred into the updated coarse feature map.

In one example, transferring the patches of the style feature map into the coarse feature map includes matching the patches of the coarse feature map to the patches of the style feature map based on a cosine similarity measure being greater than a threshold similarity value, and forming linear combinations of the patches of the coarse feature map and the patches of the style feature map. The patches of the coarse feature map can be swapped with the linear combinations to form the fine feature map.

The coarse feature map and the fine feature map are fused (block 708). In one example, feature fusion module 152 fuses the coarse feature map and the fine feature map. For instance, feature fusion module 152 may concatenate the coarse feature map and the fine feature map along channel dimensions of a decoder to form a fused feature map.

Based on the fusing, an output image including the content of the content image in the style of the style image is generated (block 710). In one example, decoder module 154 generates, based on fusing the coarse feature map and the fine feature map, an output image including the content of the content image in the style of the style image. For instance, decoder module 154 may process a fused feature map provided by feature fusion module 152 with a decoder that generates an output image including the content of the content image in the style of the style image.

The procedures described herein constitute an improvement over procedures that require transformations for multiple passes of encoding and decoding. Rather, the procedures described herein perform whitening and coloring for a single pass of encoding and decoding. Accordingly, the procedures described herein can operate with low processing delay and require low memory and processor resources, so that they support real-time operation and can be implemented on devices with limited resources. Furthermore, by iteratively transferring style features to a coarse feature map that is generated via whitening and coloring, the procedures described herein fully and robustly transfer style features of the style image to the coarse feature map. Hence, the procedures described herein can generalize to unseen style classes without introducing undesired distortion, unlike procedures that directly copy style features and are limited to seen style classes.

Having considered example procedures in accordance with one or more implementations, consider now example systems and devices that can be utilized to practice the inventive principles described herein.

Example Systems and Devices

FIG. 8 illustrates an example system generally at 800 that includes an example computing device 802 that is representative of one or more computing systems and devices that may implement the various techniques described herein. This is illustrated through inclusion of image editing system 106, system 300, image editing application 142, and image editing support system 118, which operate as described above. Computing device 802 may be, for example, a user computing device (e.g., computing device 104), or a server device of a service provider, (e.g., server 116). Furthermore, computing device 802 may include an on-chip system, multiple computing devices, combinations thereof, or any other suitable computing device or computing system. Accordingly, FIG. 8 illustrates computing device 802 as one or more of a tablet, a laptop computer, a smart phone, smart eye glasses, and a camera, though these examples are illustrative and in no way are meant to limit the type or number of devices included in computing device 802.

The example computing device 802 includes a processing system 804, one or more computer-readable media 806, and one or more I/O interfaces 808 that are communicatively coupled to each other. Although not shown, computing device 802 may further include a system bus or other data and command transfer system that couples the various components, one to another. A system bus can include any one or combination of different bus structures, such as a memory bus or memory controller, a peripheral bus, a universal serial bus, and a processor or local bus that utilizes any of a variety of bus architectures. A variety of other examples are also contemplated, such as control and data lines.

Processing system 804 is representative of functionality to perform one or more operations using hardware. Accordingly, processing system 804 is illustrated as including hardware elements 810 that may be configured as processors, functional blocks, and so forth. This may include implementation in hardware as an application specific integrated circuit or other logic device formed using one or more semiconductors. Hardware elements 810 are not limited by the materials from which they are formed or the processing mechanisms employed therein. For example, processors may be comprised of semiconductor(s) and transistors (e.g., electronic integrated circuits (ICs)). In such a context, processor-executable instructions may be electronically-executable instructions. Processors 124 in FIG. 1 are an example of processing system 804.

Computer-readable storage media 806 is illustrated as including memory/storage 812. Storage 126 in FIG. 1 is an example of memory/storage included in memory/storage 812. Memory/storage 812 may include volatile media (such as random access memory (RAM)), nonvolatile media (such as read only memory (ROM), Flash memory, optical disks, magnetic disks, and so forth), or combinations thereof. Memory/storage 812 may include fixed media (e.g., RAM, ROM, a fixed hard drive, and so on) as well as removable media (e.g., Flash memory, a removable hard drive, an optical disc, and so forth). Computer-readable media 806 may be configured in a variety of other ways as further described below.

Input/output interfaces 808 are representative of functionality to allow a user to enter commands and information to computing device 802, and also allow information to be presented to the user and other components or devices using various input/output devices. Examples of input devices include a keyboard, a cursor control device (e.g., a mouse), a microphone, an array of microphones, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, computing device 802 may be configured in a variety of ways as further described below to support user interaction.

Computing device 802 also includes applications 814. Applications 814 are representative of any suitable applications capable of running on computing device 802, and may include a web browser which is operable to access various kinds of web-based resources (e.g., assets, media clips, images, content, configuration files, services, user profiles, and the like). Applications 814 include image editing application 142, as previously described. Furthermore, applications 814 includes any applications supporting image editing system 106, system 300, and image editing support system 118.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by computing device 802. By way of example, and not limitation, computer-readable media may include "computer-readable storage media" and "computer-readable signal media."

"Computer-readable storage media" refers to media, devices, or combinations thereof that enable persistent or non-transitory storage of information in contrast to mere signal transmission, carrier waves, or signals per se. Thus, computer-readable storage media does not include signals per se or signal bearing media. The computer-readable storage media includes hardware such as volatile and non-volatile, removable and non-removable media, storage devices, or combinations thereof implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" refers to a signal-bearing medium that is configured to transmit instructions to the hardware of the computing device 802, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic, fixed device logic implemented in a hardware form, or combinations thereof that may be employed in some aspects to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions, logic embodied by the hardware, or combinations thereof, as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions, logic embodied on some form of computer-readable storage media or by one or more hardware elements 810, or combinations thereof. Computing device 802 may be configured to implement particular instructions and functions corresponding to the software and hardware modules. Accordingly, implementation of a module that is executable by computing device 802 as software may be achieved at least partially in hardware, e.g., through use of computer-readable storage media and hardware elements 810 of processing system 804. The instructions and functions may be executable/operable by one or more articles of manufacture (for example, one or more computing devices such as computing device 802 or processing systems such as processing system 804) to implement techniques, modules, and examples described herein.

The techniques described herein may be supported by various configurations of computing device 802 and are not limited to the specific examples of the techniques described herein. This functionality may also be implemented all or in part through use of a distributed system, such as over a "cloud" 816 via a platform 818 as described below.

Cloud 816 includes and is representative of a platform 818 for resources 820. Platform 818 abstracts underlying functionality of hardware (e.g., servers) and software resources of cloud 816. Resources 820 may include applications, data, or applications and data that can be utilized while computer processing is executed on servers that are remote from computing device 802. Resources 820 can also include services provided over the Internet, through a subscriber network, such as a cellular or Wi-Fi network, or combinations thereof. Resources 820 can include asset store 822, which stores assets, such as images, photographs (e.g., user images in a gallery, a database of stock photographs, and the like), documents, user profile data, user image libraries, photographs posted in a shared photo service, animation sequences, videos, digital images (e.g., content images and style images), metadata of assets, training datasets of images, networks (e.g., pre-trained encoders and feature extractors) and the like, and may be accessed by computing device 802.

Platform 818 may abstract resources and functions to connect computing device 802 with other computing devices. Platform 818 may also serve to abstract scaling of resources to provide a corresponding level of scale to encountered demand for resources 820 that are implemented via platform 818. Accordingly, in an interconnected device embodiment, implementation of functionality described herein may be distributed throughout system 800. For example, the functionality may be implemented in part on computing device 802 as well as via platform 818 that abstracts the functionality of cloud 816.

Conclusion

In one or more implementations, a digital medium environment includes at least one computing device. Systems, devices, and techniques are described herein for transferring image style to content of a digital image. An image editing system includes an encoder that extracts features from a content image and extracts features from a style image. A whitening and color transform generates coarse features from the content and style features extracted by the encoder for one pass of encoding and decoding, rather than multiple passes. Hence, the processing delay and memory requirements are low. To enhance the ability of the image editing system to generalize to unseen style classes, a feature transfer module iteratively transfers style features to the coarse feature map and generates a fine feature map. The image editing system fuses the fine features generated by the feature transfer module with the coarse features generated by the whitening and color transform, and a decoder generates an output image with content of the content image in a style of the style image. Accordingly, the image editing system efficiently transfers an image style to image content in real-time, without undesirable artifacts in the output image.

Although the invention has been described in language specific to structural features and methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment for editing digital images, a method implemented by a computing device, the method comprising:
   extracting features of a content image into a content feature map;
   extracting features of a style image into a style feature map;
   generating a coarse feature map by whitening the content feature map and coloring, based on the style feature map, results of the whitening;
   iteratively updating the coarse feature map by:
      swapping patches of the coarse feature map with patches determined from the style feature map to form a fine feature map; and
      generating, from the fine feature map, an updated coarse feature map for use in a next iteration of the iteratively updating;
   fusing the coarse feature map generated by the whitening and the coloring with the fine feature map; and
   generating, based on the fusing, an output image with content of the content image in a style of the style image.

2. The method as described in claim 1, wherein the generating the coarse feature map comprises matching a covariance matrix of the coarse feature map and a covariance matrix of the style feature map.

3. The method as described in claim 1, wherein the whitening includes applying a first linear transformation to the content feature map and the coloring includes applying a second linear transformation to the results of the whitening, the first linear transformation determined from a decomposition of a covariance matrix of the content feature map and the second linear transformation determined from a decomposition of a covariance matrix of the style feature map.

4. The method as described in claim 1, further comprising matching the patches of the coarse feature map to corresponding patches of the style feature map based on a similarity measure to determine the patches determined from the style feature map.

5. The method as described in claim 4, further comprising linearly combining the patches of the coarse feature and the corresponding patches of the style feature map to determine the patches determined from the style feature map.

6. The method as described in claim 4, further comprising repeating the iteratively updating until the similarity measure between the patches of the coarse feature map and the corresponding patches of the style feature map is below a threshold similarity.

7. The method as described in claim 1, further comprising linearly combining the coarse feature map and the fine feature map to generate the updated coarse feature map.

8. The method as described in claim 1, wherein the fusing comprises concatenating the fine feature map and the coarse feature map generated by the whitening and the coloring along a channel dimension of a decoder that generates the output image.

9. The method as described in claim 8, wherein the style belongs to an unseen style class that is not used when training the decoder.

10. An image editing system implemented by a computing device in a digital medium environment, the image editing system including modules implemented at least partially in hardware of the computing device, the image editing system comprising:
    a user interface module to obtain a content image including content and a style image having artwork in a reference style;
    an encoder module to generate a content feature map from features of the content image and a style feature map from features of the style image;
    a whitening and coloring module to generate a coarse feature map by whitening the content feature map and coloring, based on the style feature map, results of the whitening so that covariance matrices of the coarse feature map and the style feature map match;
    a feature transfer module to:
        match patches of the coarse feature map to patches of the style feature map; and
        swap the matching patches of the style feature map into the coarse feature map to form a fine feature map;
    a feature fusion module to concatenate the coarse feature map and the fine feature map along a channel dimension of a decoder module; and
    the decoder module to generate, based on the concatenate, an output image with the content of the content image and the reference style of the style image.

11. The image editing system as described in claim 10, wherein the feature transfer module is configured to repeat the match and the swap using an updated coarse feature map determined from the fine feature map until patches of the updated coarse feature map do not match the patches of the style feature map.

12. The image editing system as described in claim 11, wherein the feature transfer module is further configured to generate, at each iteration of the repeat, the updated coarse feature map as a linear combination of a previous coarse feature map from a previous iteration and the fine feature map at a current iteration.

13. The image editing system as described in claim 11, wherein the feature transfer module is further configured to:
    generate similarity measures between the patches of the updated coarse feature map and the patches of the style feature map; and
    compare the similarity measures to a threshold similarity value, wherein the patches of the updated coarse feature map that do not match the patches of the style feature map are determined based on the compare.

14. The image editing system as described in claim 10, wherein to swap the matching patches includes the feature transfer module to:
    blend the patches of the coarse feature map with the matching patches of the style feature map to form blended patches; and
    replace the patches of the coarse feature map with the blended patches to form the fine feature map.

15. The image editing system as described in claim 10, wherein the whitening and coloring module is configured to determine a first linear transformation from a covariance matrix of the content feature map and a second linear transformation from a covariance matrix of the style feature map, the whitening includes to apply the first linear transformation to the content feature map, and the coloring includes to apply the second linear transformation to the results of the whitening.

16. The image editing system as described in claim 10, further comprising a training module configured to:
    determine a loss based on the content image, the style image, and the output image, the loss comprising a style loss and a content loss; and
    adjust weights of at least one of the encoder module or the decoder module based on the loss.

17. In a digital medium environment for editing digital images, a method implemented by a computing device, the method comprising:
    generating a content feature map from features of a content image having content and a style feature map from features of a style image depicted in a style;
    a step for transforming the content feature map into a coarse feature map having same covariance statistics as the style feature map;
    a step for transferring patches of the style feature map into the coarse feature map to form a fine feature map, the patches of the style feature map determined to match patches of the coarse feature map;
    a step for fusing the coarse feature map and the fine feature map; and
    a step for generating, based on the fusing, an output image including the content of the content image in the style of the style image.

18. The method as described in claim 17, wherein the step for transferring the patches of the style feature map is performed iteratively, each iteration comprising generating an updated coarse feature map, based on the fine feature map, for use in a next iteration, in which at least one patch of the style feature map is transferred into the updated coarse feature map.

19. The method as described in claim 17, wherein the step for transforming comprises:
    generating a first singular-value decomposition of a covariance matrix of the content feature map;
    generating a second singular-value decomposition of a covariance matrix of the style feature map;
    transforming the content feature map with a first linear transformation determined from the first singular-value decomposition to form a transformed content feature map; and
    transforming the transformed content feature map with a second linear transformation determined from the second singular-value decomposition to form the coarse feature map.

20. The method as described in claim 17, wherein the step for transferring the patches of the style feature map into the coarse feature map comprises:
    matching the patches of the coarse feature map to the patches of the style feature map based on a cosine similarity measure being greater than a threshold similarity value;
    forming linear combinations of the patches of the coarse feature map and the patches of the style feature map; and
    swapping the patches of the coarse feature map with the linear combinations to form the fine feature map.

* * * * *